April 14, 1964  W. H. ROGERS ETAL  3,128,484
MACHINE FOR MAKING FLEXIBLE BOOK COVERS OR SIMILAR ARTICLES
Filed Sept. 8, 1961  22 Sheets-Sheet 12
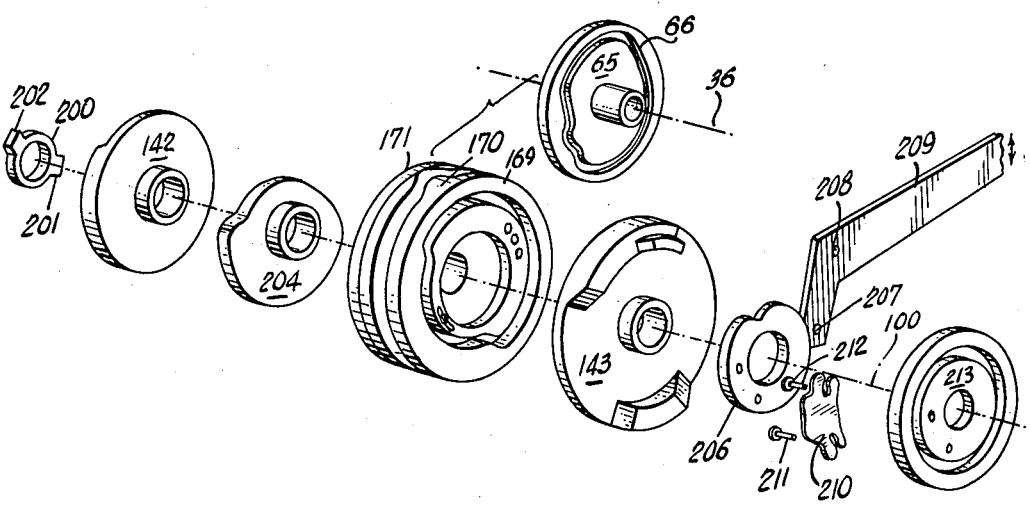
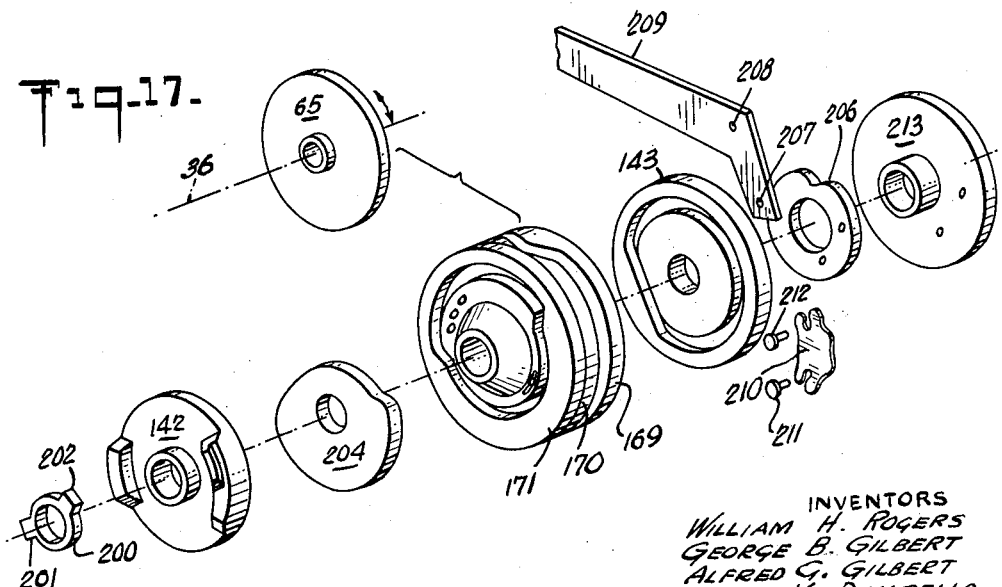
INVENTORS
WILLIAM H. ROGERS
GEORGE B. GILBERT
ALFRED G. GILBERT
JOSEPH V. DINARELLO
BY
Morrison Kennedy & Campbell
ATTORNEYS April 14, 1964 W. H. ROGERS ETAL 3,128,484
MACHINE FOR MAKING FLEXIBLE BOOK COVERS OR SIMILAR ARTICLES
Filed Sept. 8, 1961 22 Sheets-Sheet 13

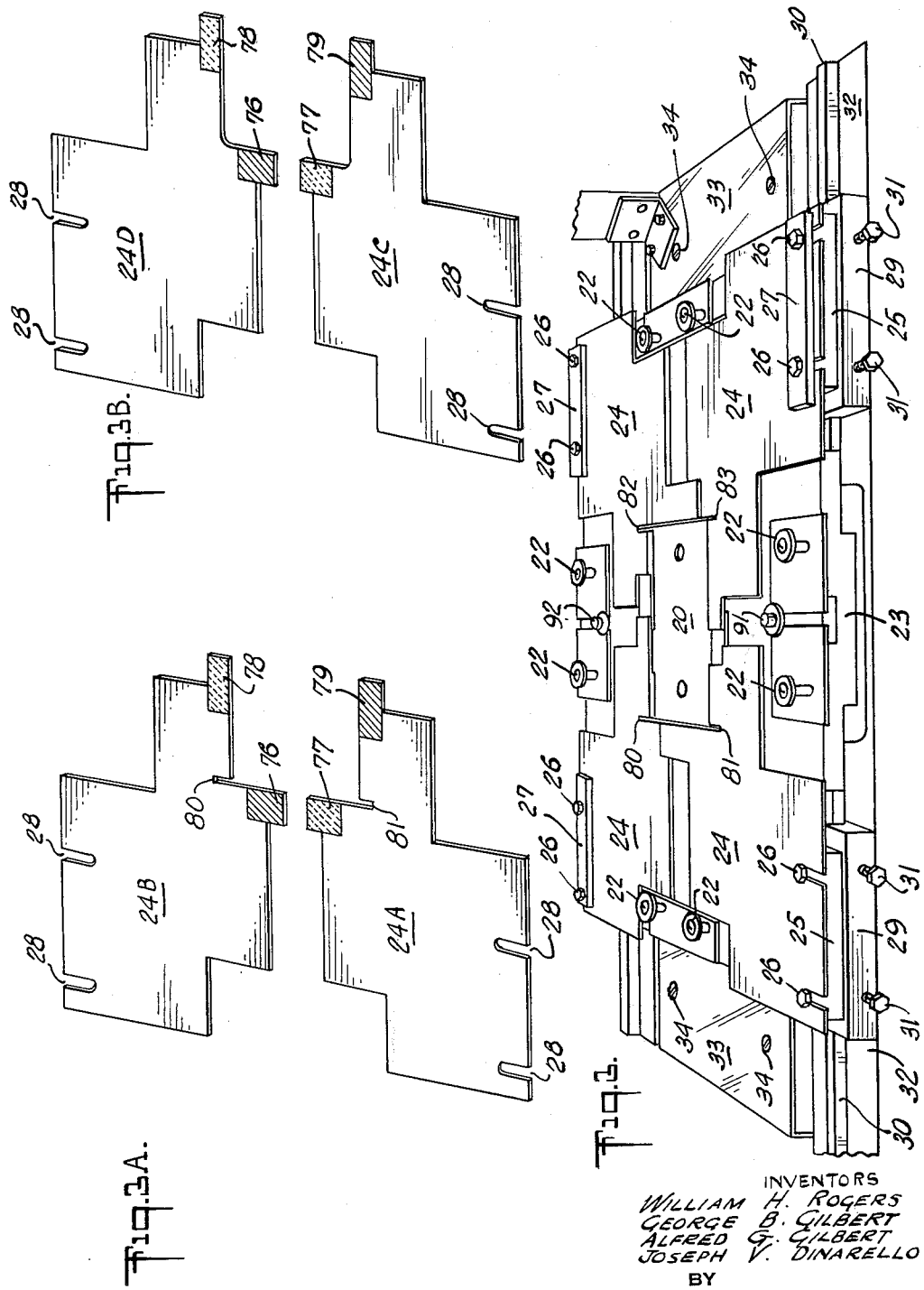

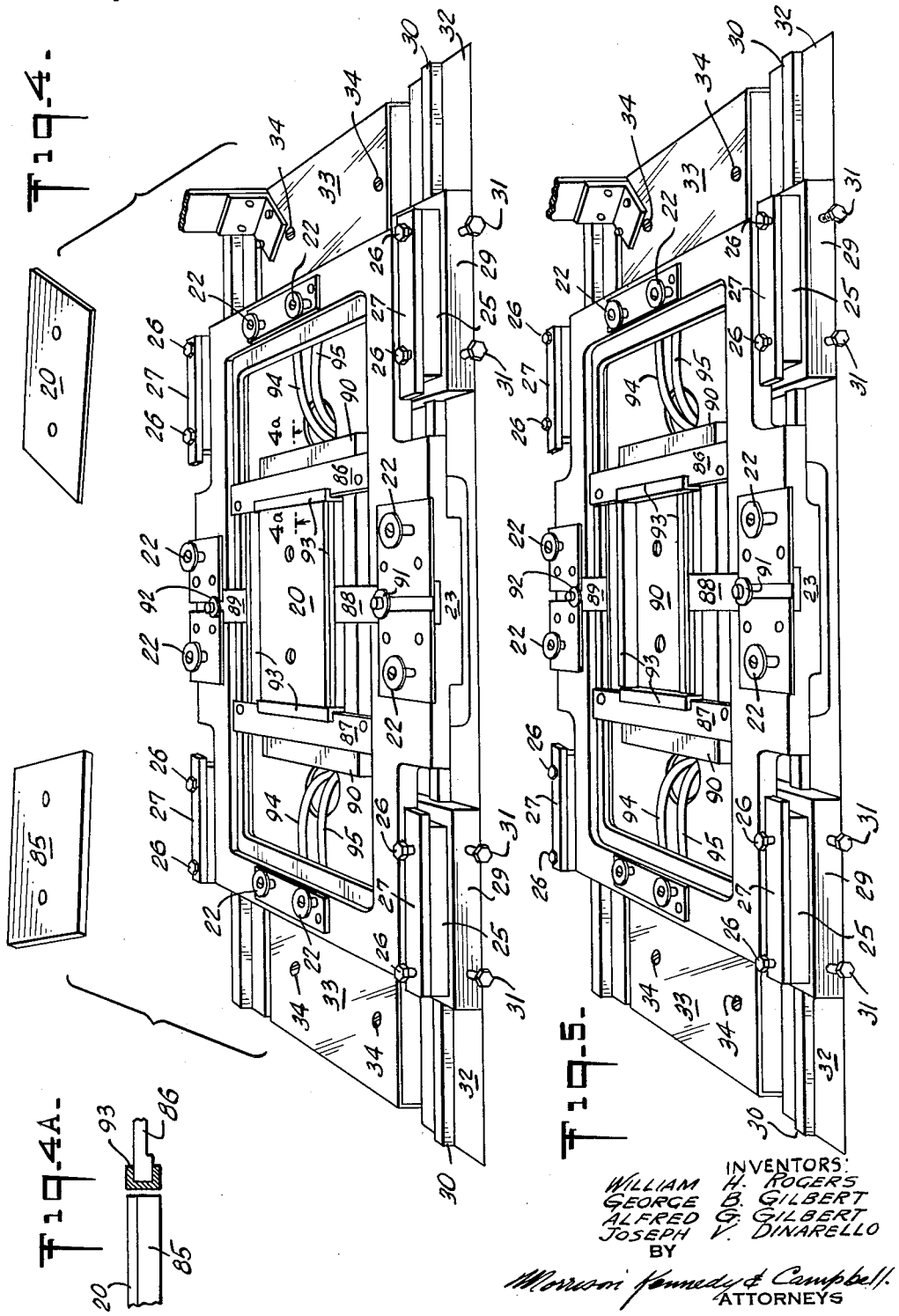

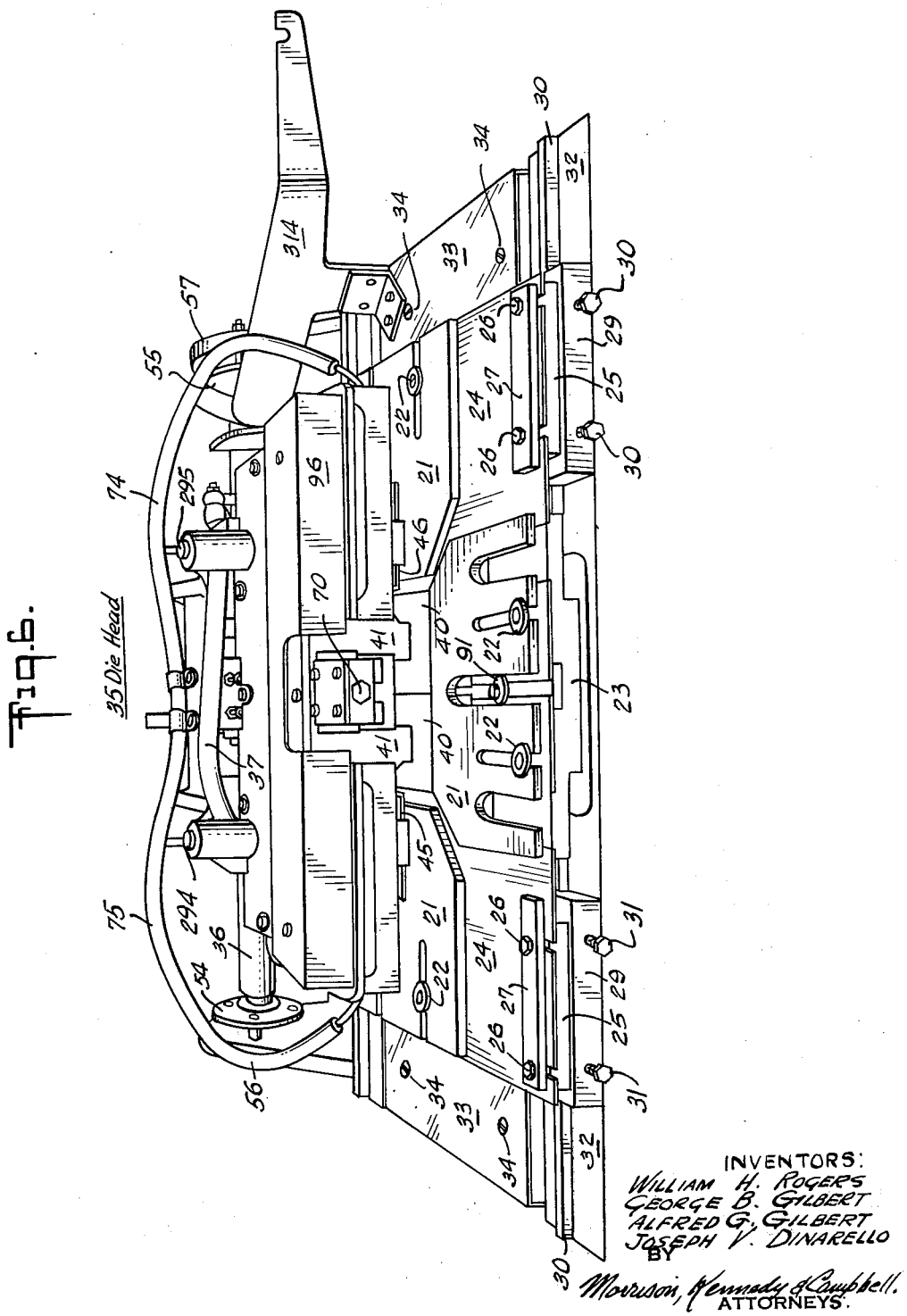

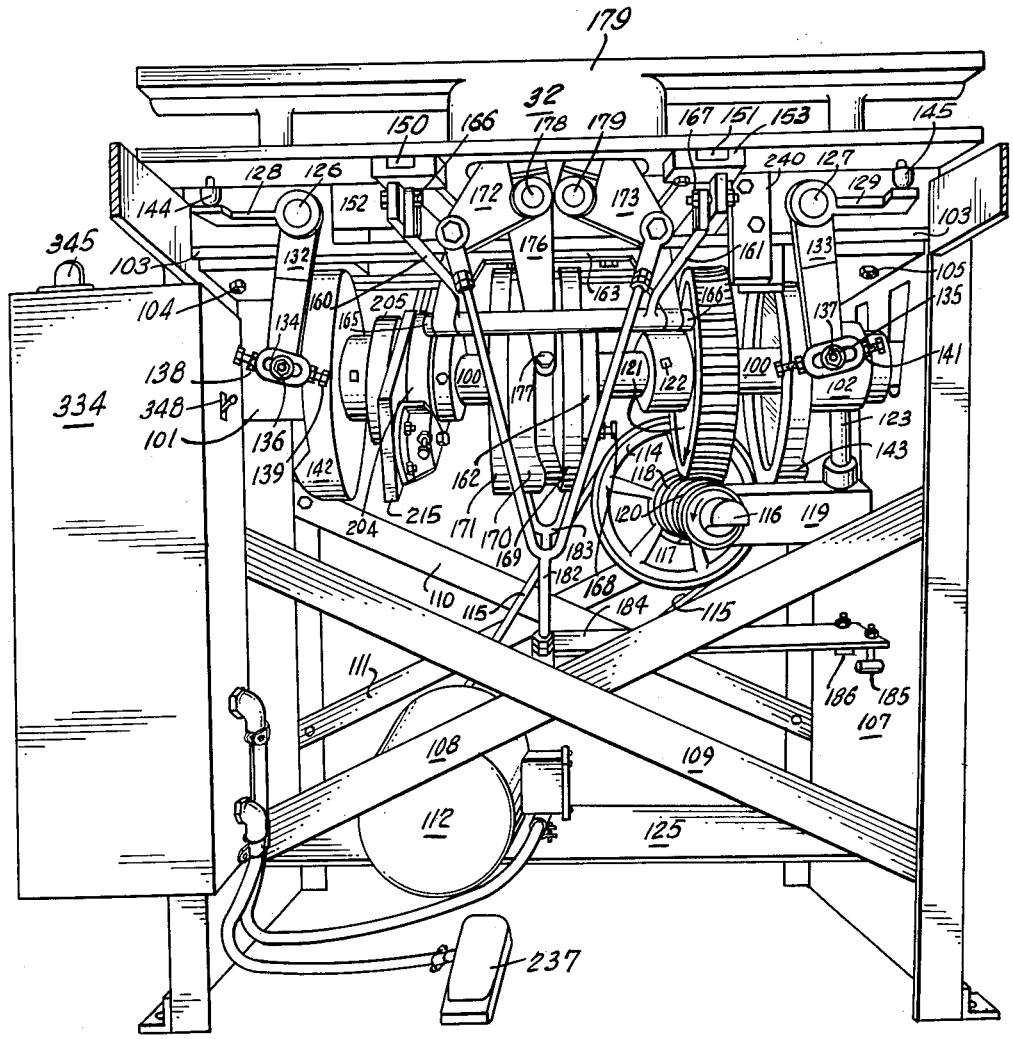

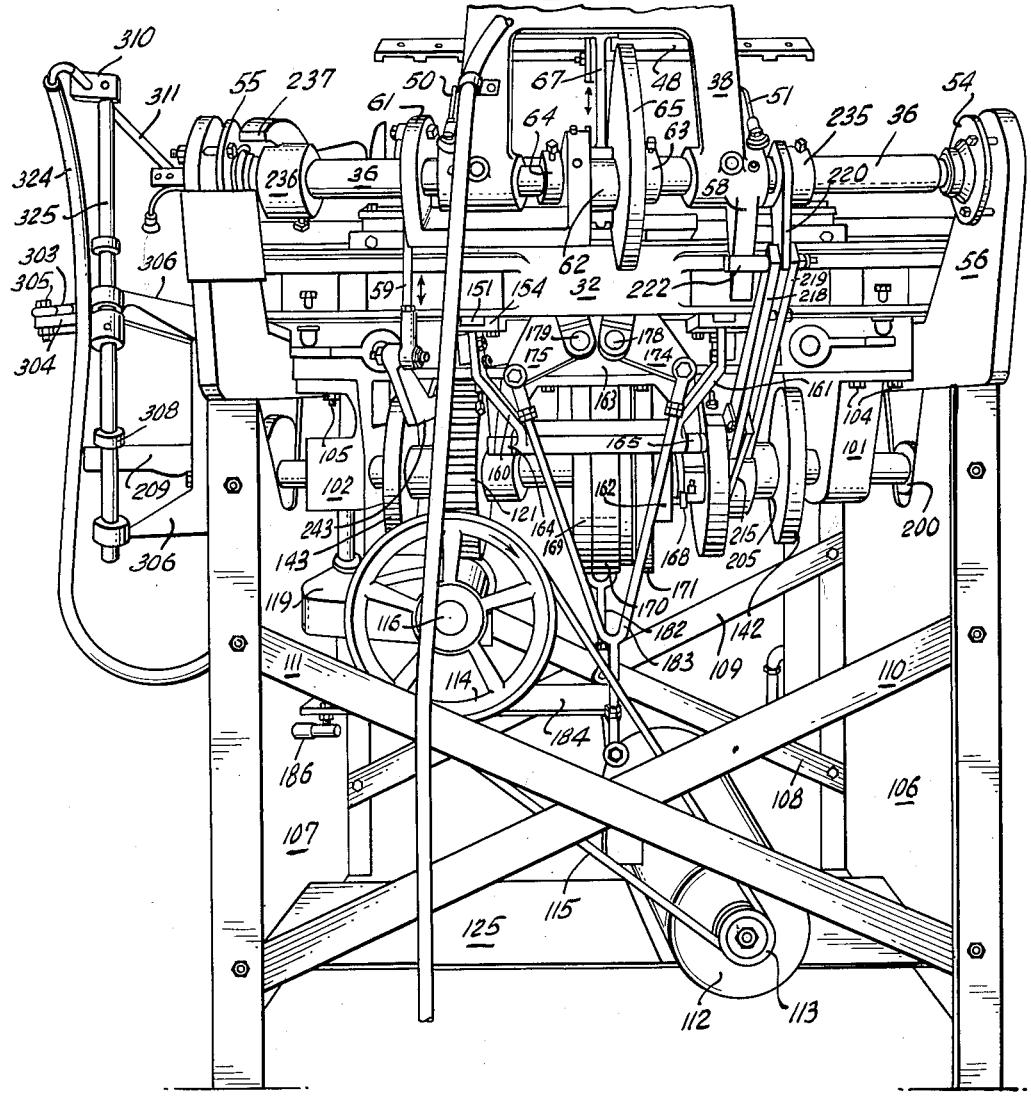

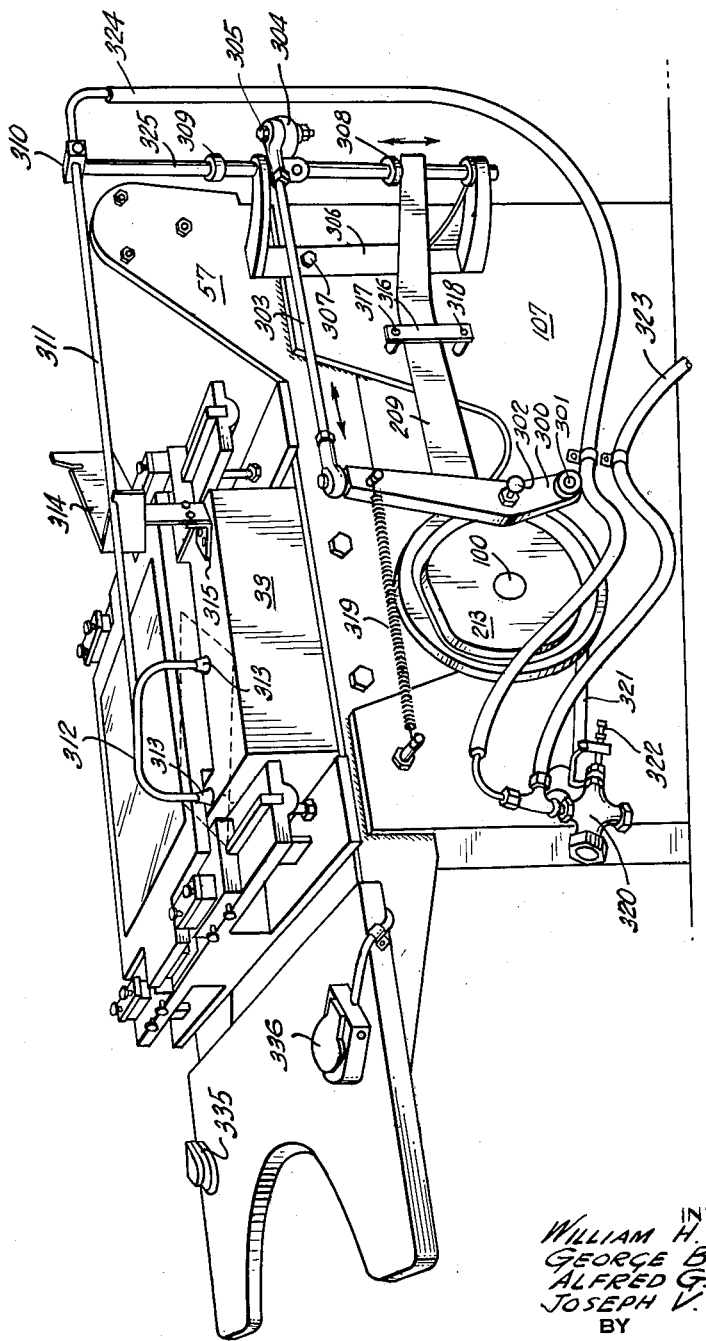

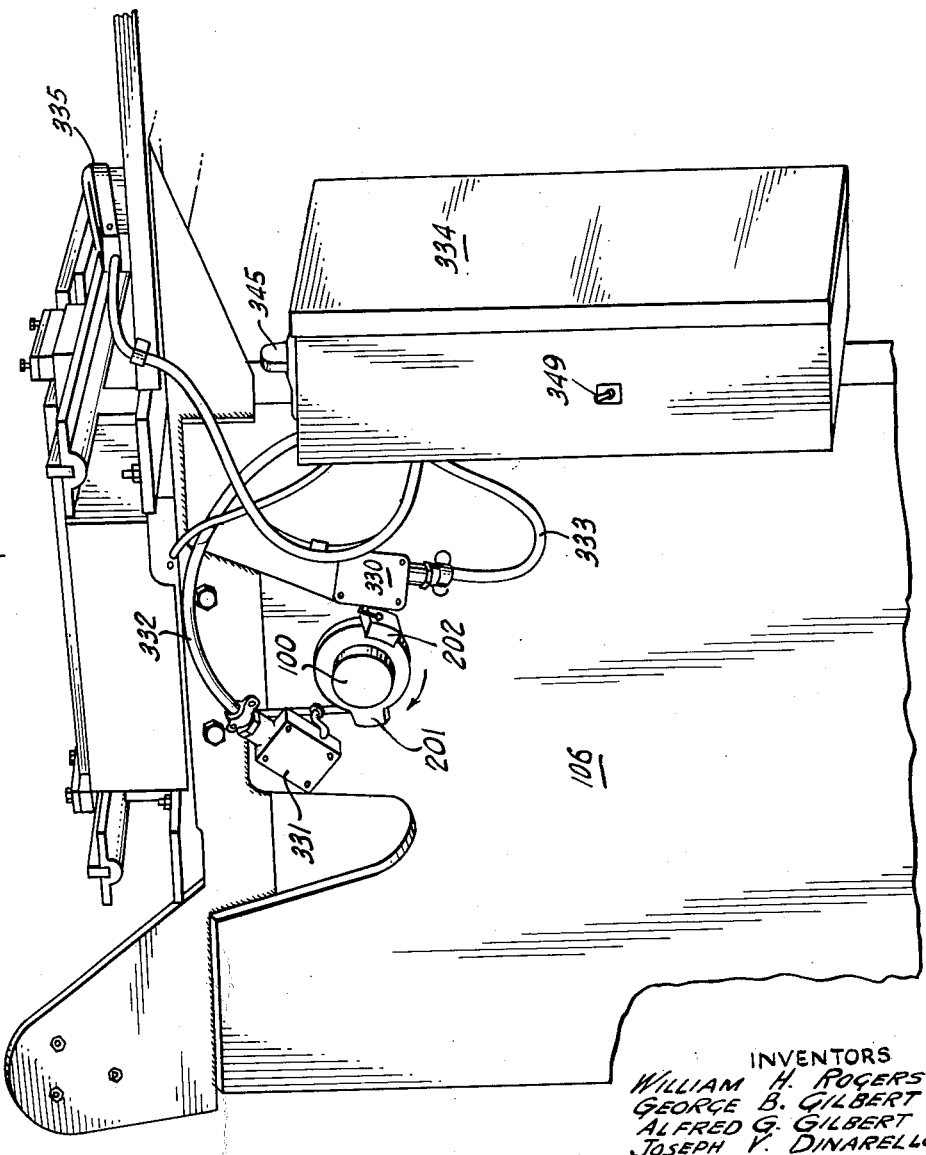

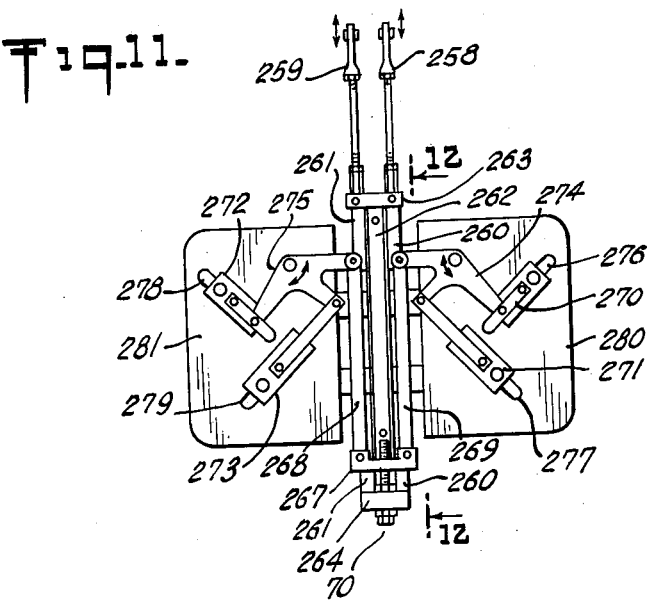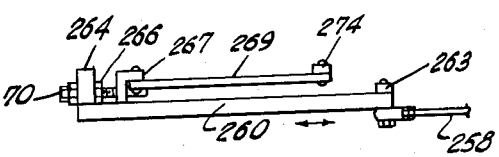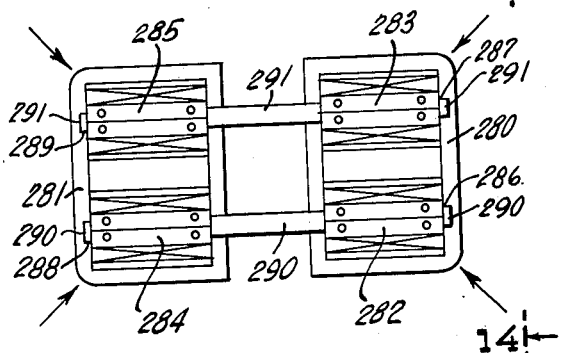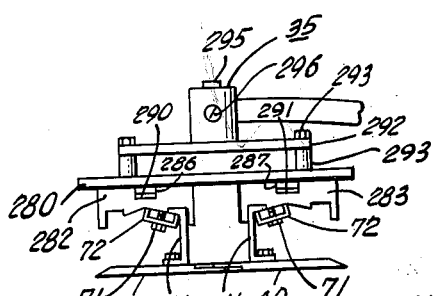

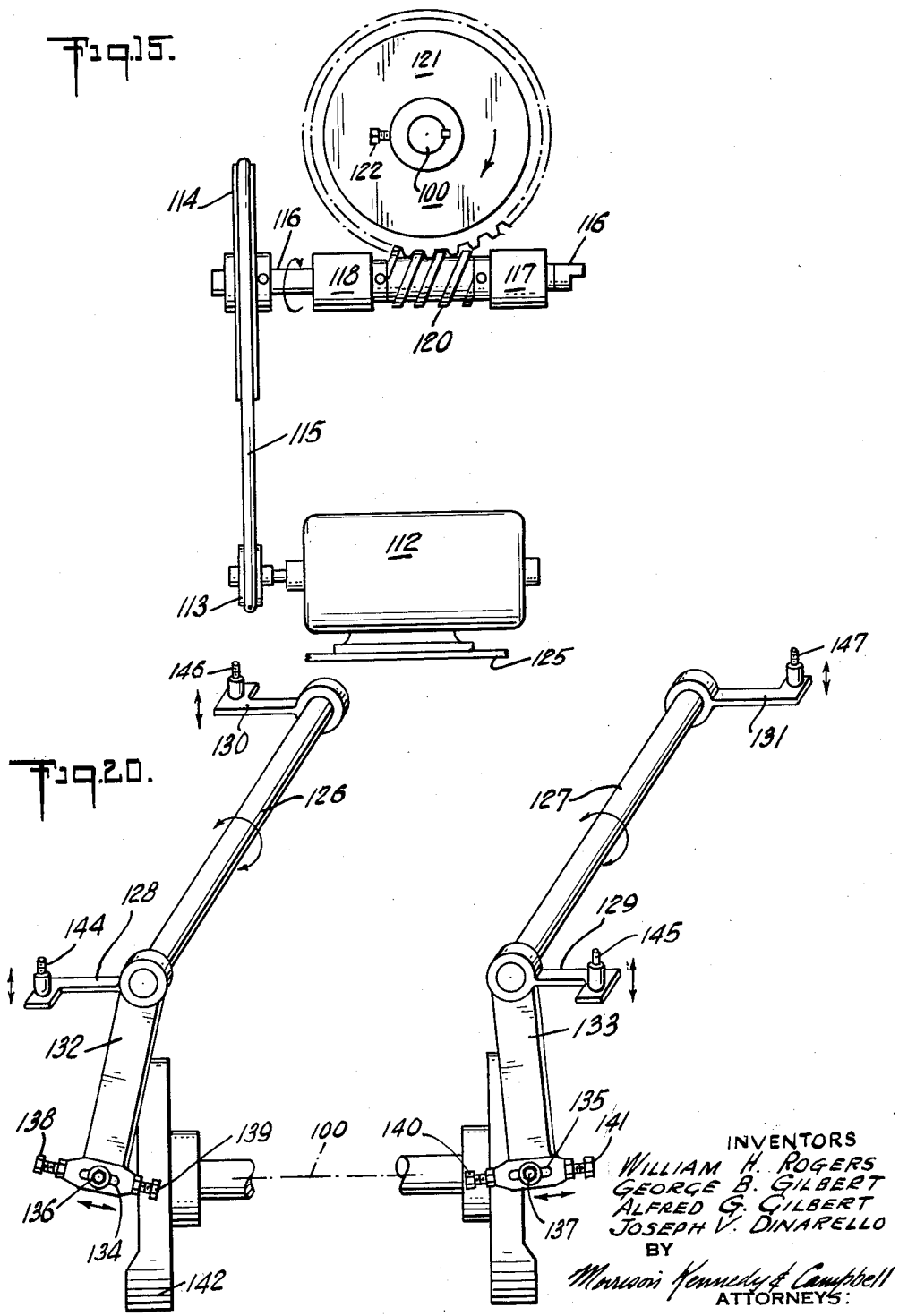

INVENTORS
WILLIAM H. ROGERS
GEORGE B. GILBERT
ALFRED G. GILBERT
JOSEPH V. DINARELLO
BY
Morrison Kennedy & Campbell
ATTORNEYS April 14, 1964     W. H. ROGERS ETAL     3,128,484
MACHINE FOR MAKING FLEXIBLE BOOK COVERS OR SIMILAR ARTICLES
Filed Sept. 8, 1961     22 Sheets-Sheet 14
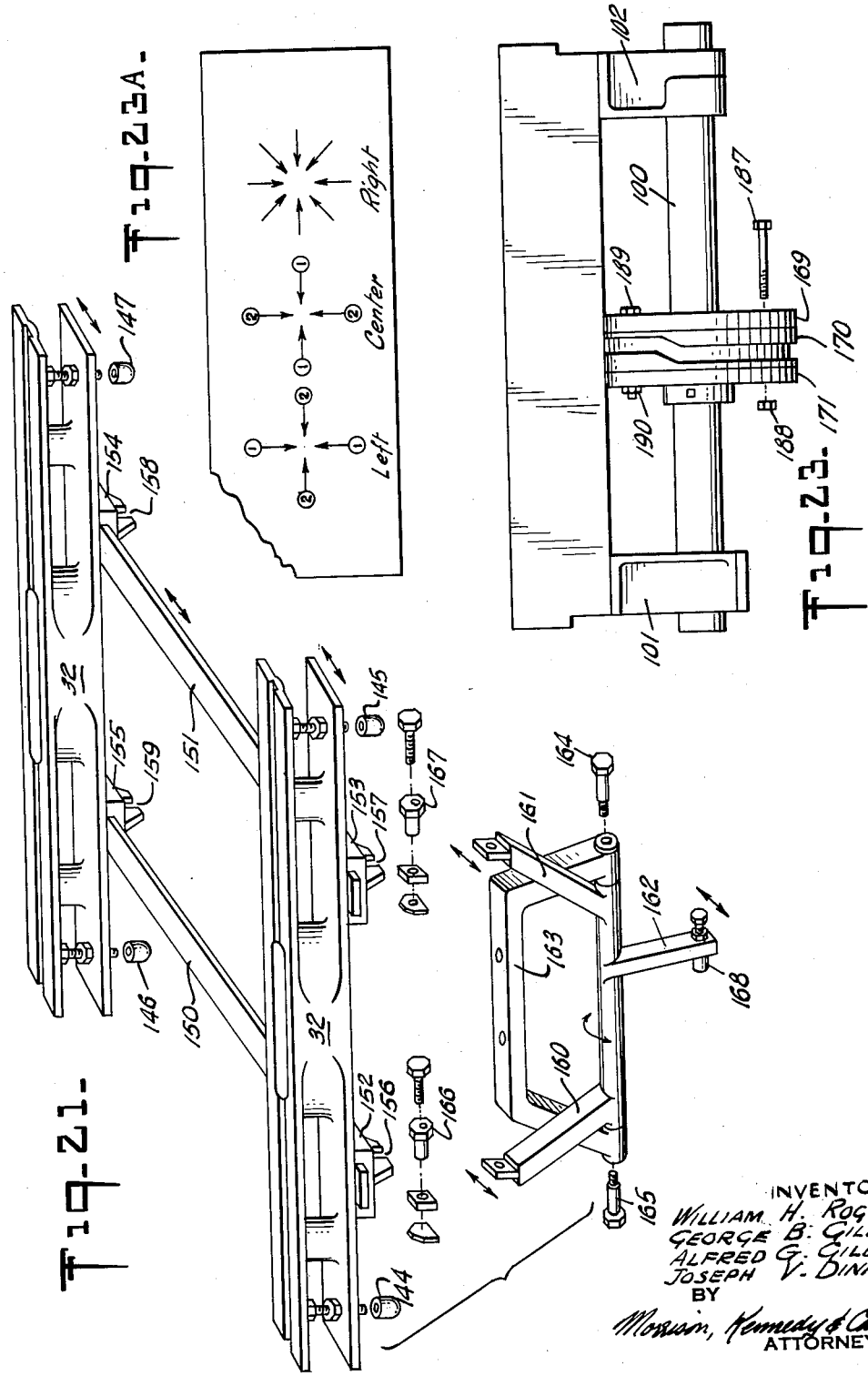
INVENTORS
WILLIAM H. ROGERS
GEORGE B. GILBERT
ALFRED G. GILBERT
JOSEPH V. DINARELLO
BY
Morrison, Kennedy & Campbell
ATTORNEYS

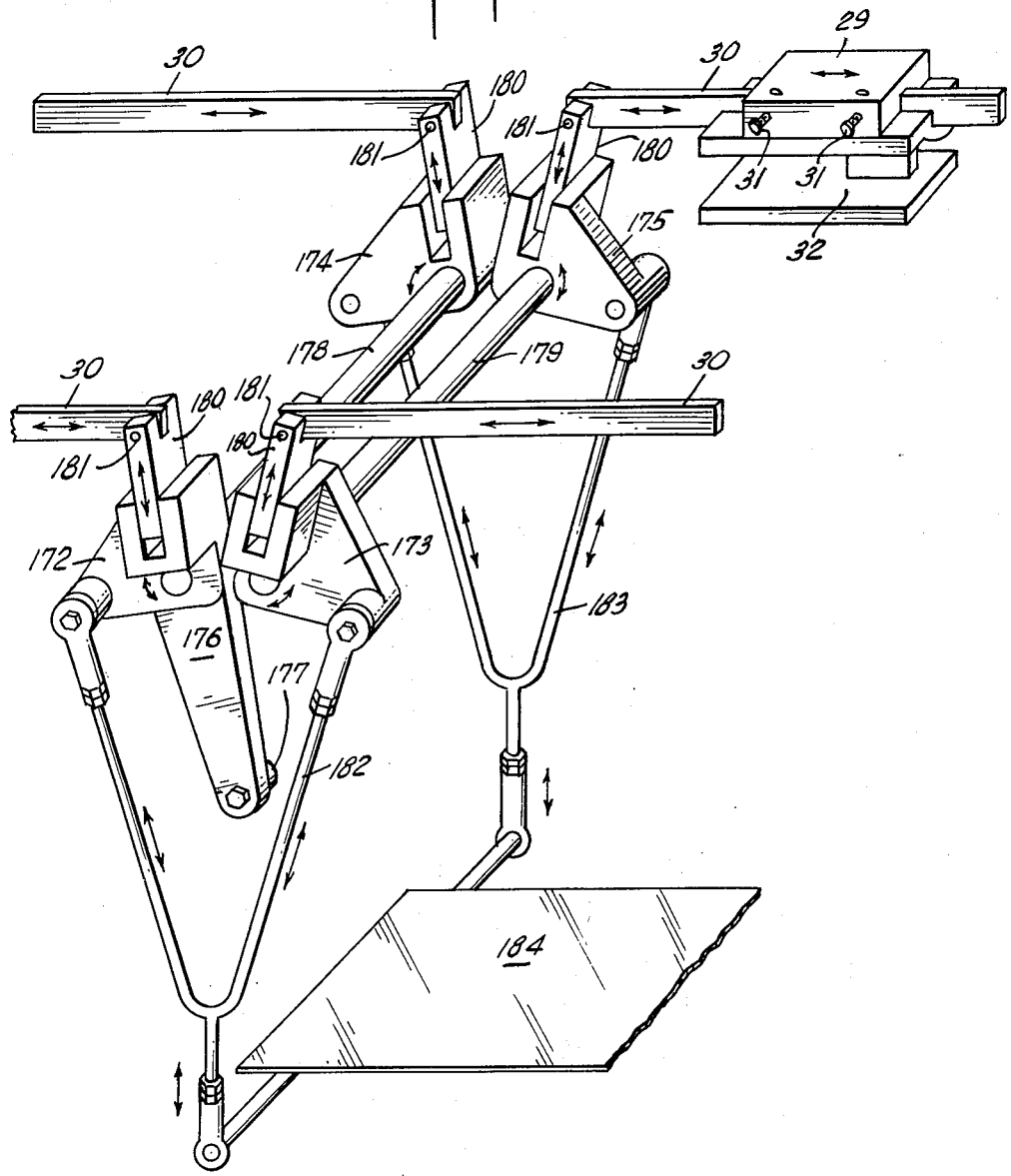

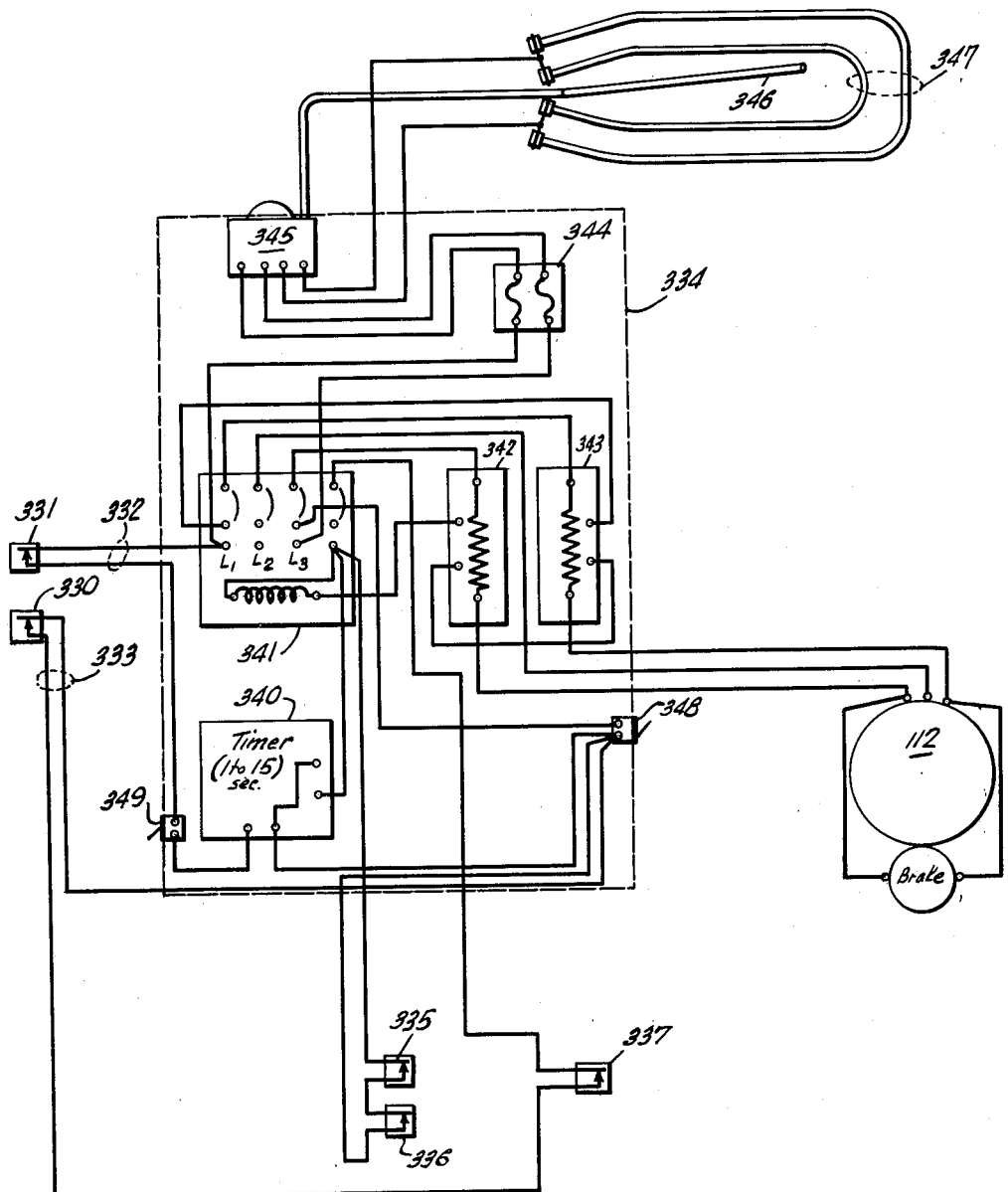

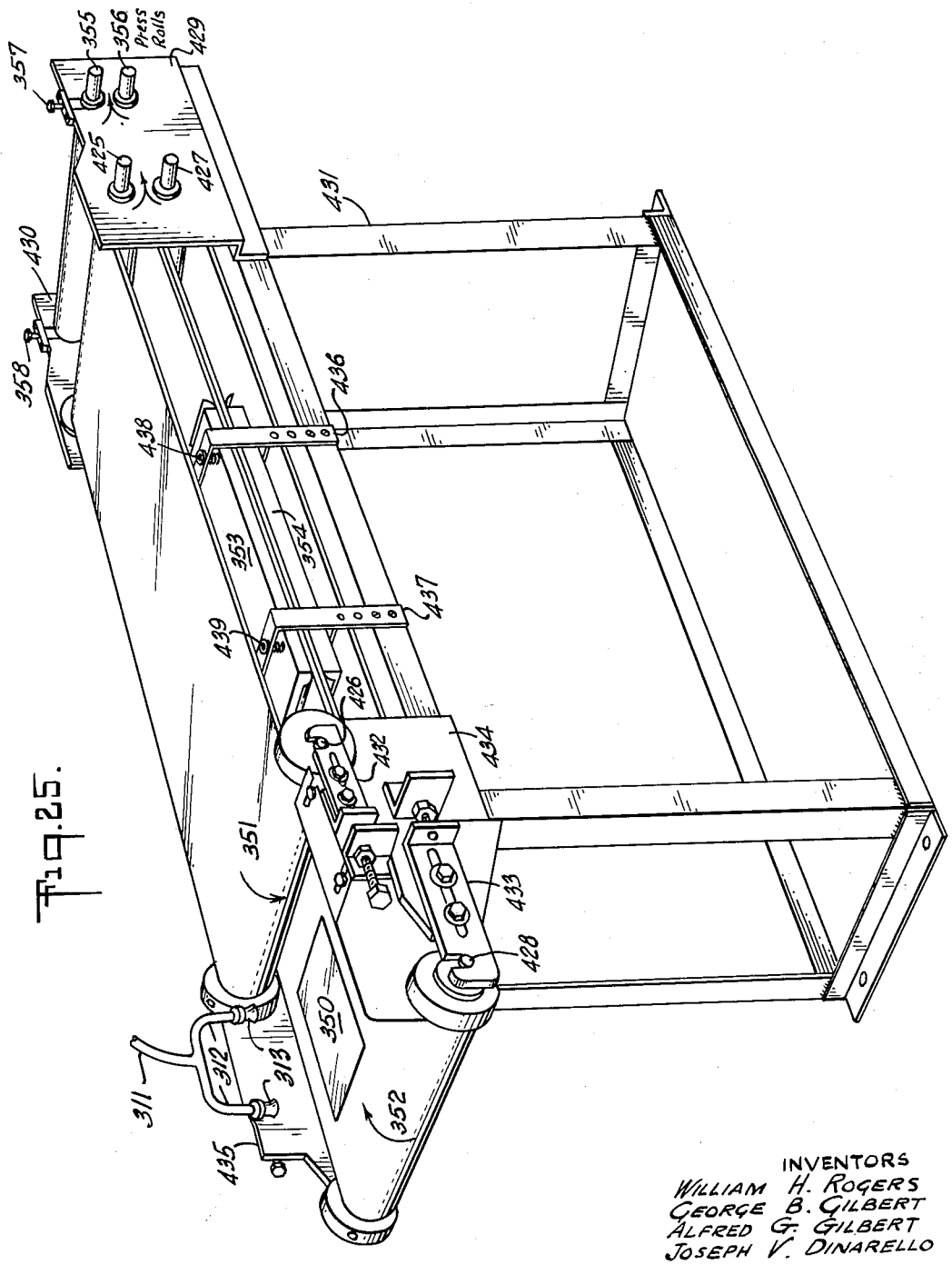

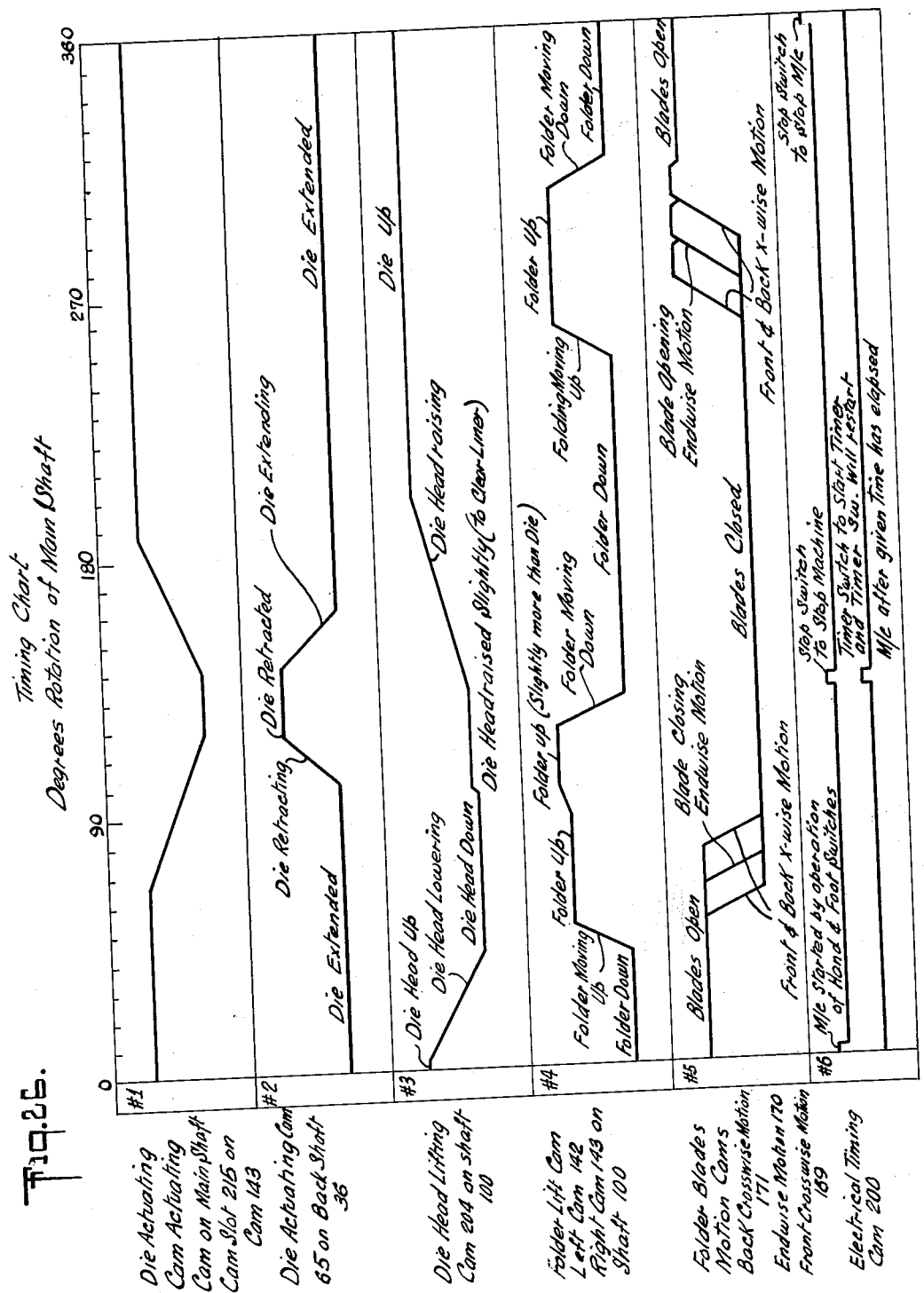

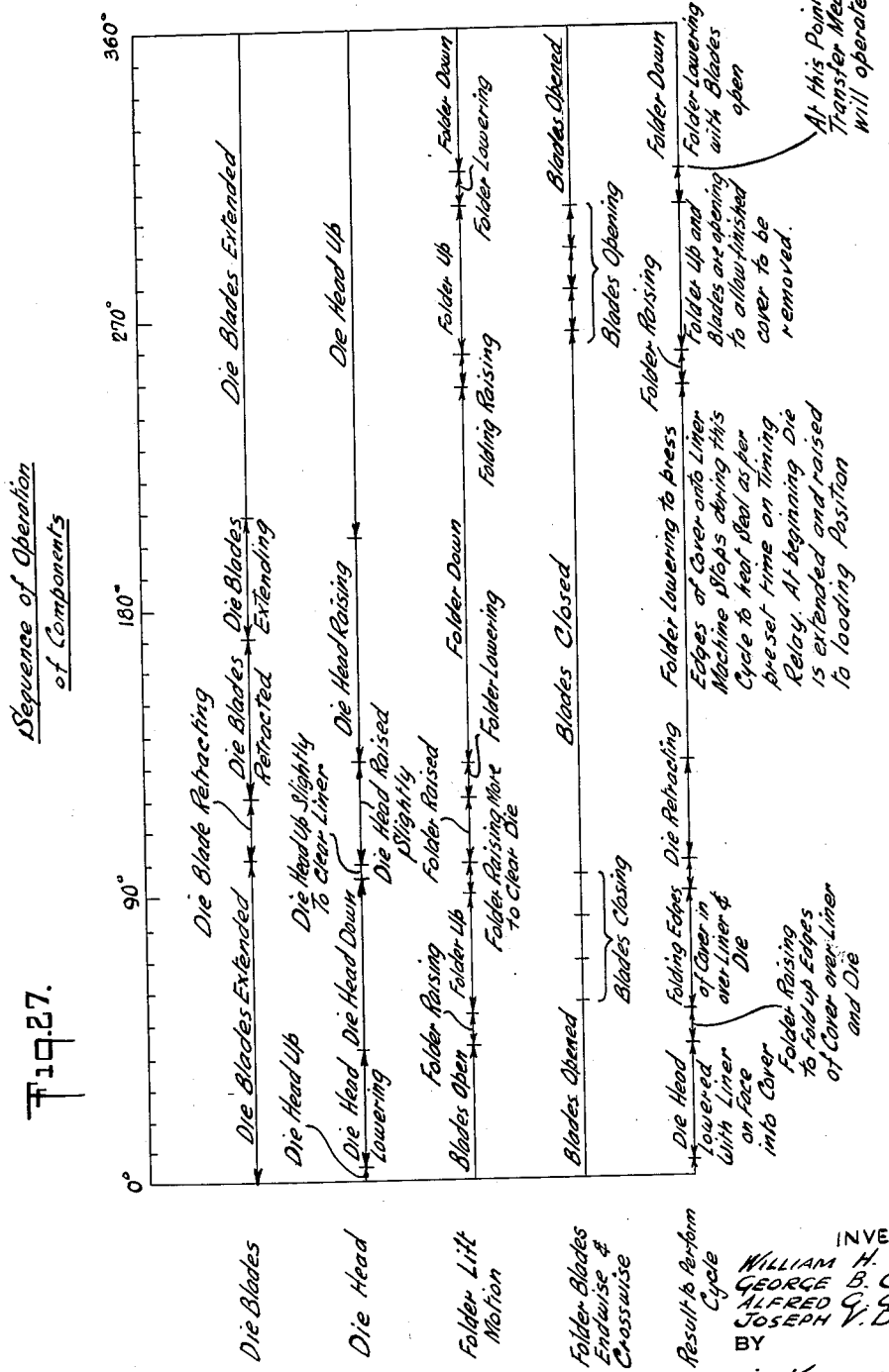

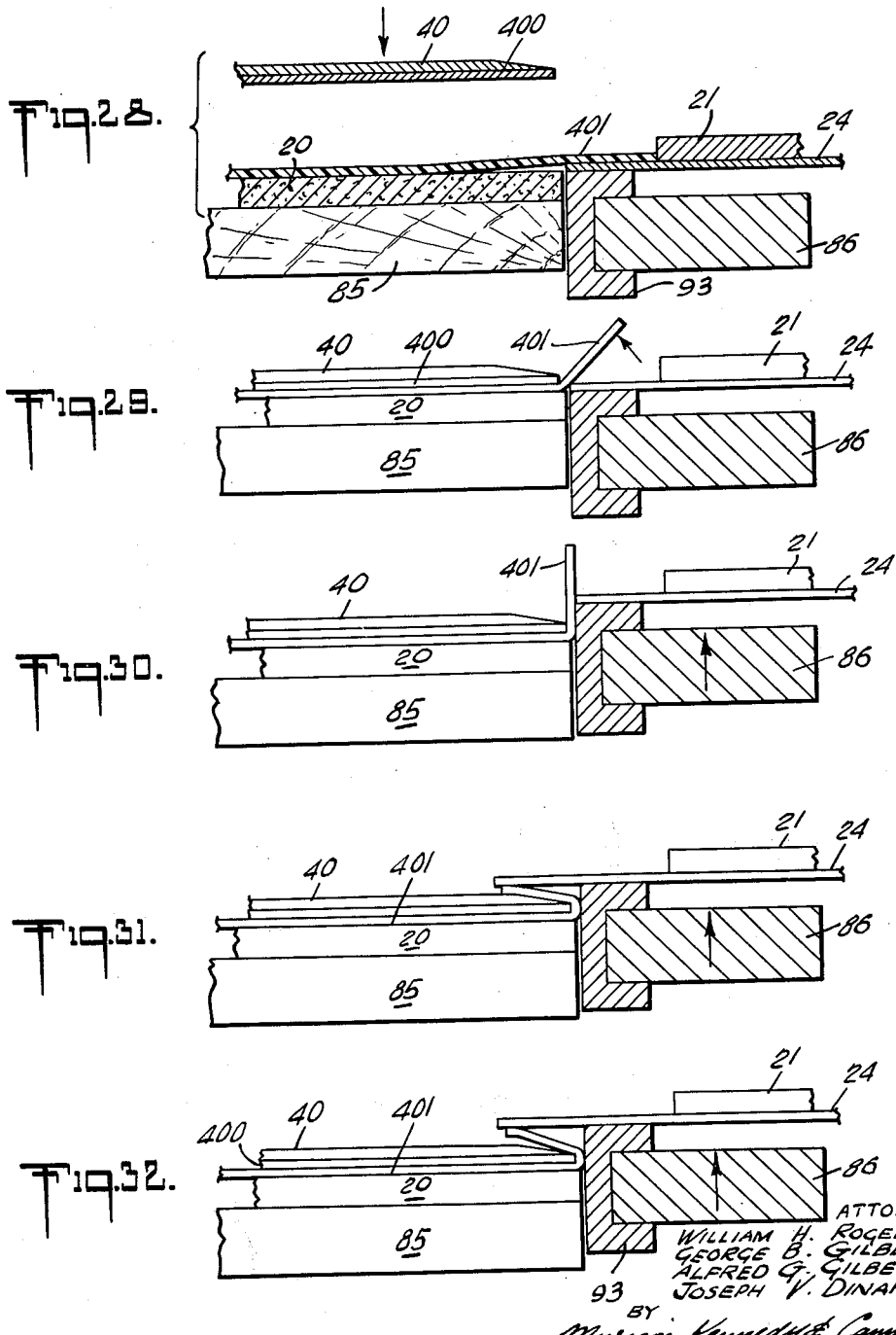

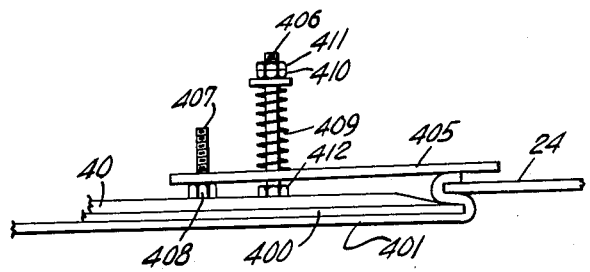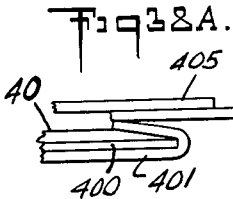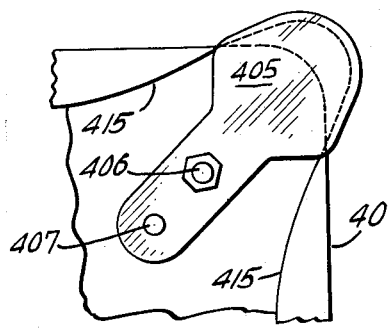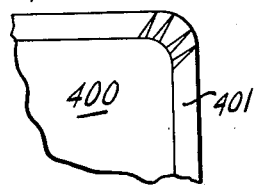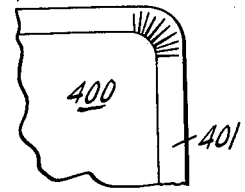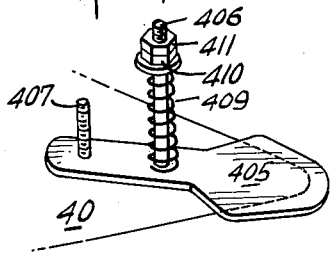

United States Patent Office

3,128,484
Patented Apr. 14, 1964

3,128,484
MACHINE FOR MAKING FLEXIBLE BOOK
COVERS OR SIMILAR ARTICLES
William H. Rogers, Reading, Mass., George B. Gilbert, Hudson, N.H., and Alfred G. Gilbert, South Acton, and Joseph V. Dinarello, Melrose, Mass., assignors to Reece Folding Machine Company, a corporation of Maine
Filed Sept. 8, 1961, Ser. No. 136,930
16 Claims. (Cl. 11—2)

This invention is directed to a new and useful machine for making flexible square or round-cornered book covers and similarly constructed articles. The invention derives its novelty and utility from its efficient use of pre-cut parts that have been previously partially or completely coated with compounds which develop adhesive properties when heated.

A flexible book cover is made of a piece of covering material, leather, book cloth, paper or other pliable sheet material and one or more liner pieces, usually thin cardboard or paper. The liner pieces must be accurately aligned on the reverse side of the cover piece at the required dimensions and with an even margin of the cover piece showing all around the perimeter of the liner pieces. This exposed margin must then be uniformly and tightly turned up and over the edge of the liners and pressed down. It is also required that liners and cover be firmly cemented together, sometimes only along the marginal turn-in, but usually wherever the parts are in contact. Because of the use, both past and present, of wet or tacky glues, cements and pastes, this procedure even today is largely a hand assembly operation. By breaking down the work among several workers and using conveyors, gluing machines, fixtures, etc., it is possible to attain considerable production fairly economically. However, the number of people required is quite large, labor cost per piece is high and considerable supervision is required to keep such an arrangement going. Our method through the use of heat activated adhesives so simplifies the making of flexible book covers and like articles that any user will gain a considerable economic advantage. Furthermore, covers made by this method are more consistent in size and shape than hand-made covers, even those made in a series of mechanized fixtures, and are, therefore, easier to handle in the machinery used to emboss the covers and assemble the book. Quality is achieved at less cost.

The invention is in a broad sense a method of combining a thin pliable covering piece, pre-coated partially or all over with heat sensitive material, with one or more lining pieces which also may or may not be pre-coated with similar material. All pieces are located and held in correct alignment to desired size while part or all of the margin of the covering piece is turned up and over the edge or edges of the liner pieces. After turning-in is finished, controlled heat and pressure is applied in two or more steps to activate the adhesive coating, seal the joined pieces together and smooth the completed cover. It can thus be seen that the invention could be used for articles other than flexible round-cornered book covers. It may be used for stiff-backed round-cornered covers by using thicker lining pieces. It also may be used for articles having square or angular corners or articles with shapes other than square or rectangular, for instance, circular or elliptical pieces can be done. Any combination of pliable cover and lining where part or all of the exposed margin of the cover is to be turned over adjacent edges of the liner and sealed together could be condered as a suitable application of this invention.

In practice the working of our invention is accomplished by the coordinated functioning of several units, all being necessary to attain the desired result economically. These units make use of controlled motion, heat, pressure, time and vacuum to manipulate, position, fold-over or turn-in, seal, press and smooth pre-cut and pre-coated parts in a continuous process producing finished covers or the like. In order these units are:

First, a folding-in machine with cover and liner stock locating and holding device, various means of adjustment to accommodate a range of sizes, mechanical means to actuate necessary folder blades and supporting parts, electrically controlled driving means and thermostatically controlled heat source.

Second, a mechanical and vacuum means of transferring partially completed work pieces from folding-in machine, unit one, to sealing and smoothing machine, unit three.

Third, a sealing and smoothing machine with mechanical means to activate conveyors and rolls, electrically controlled driving means and thermostatically controlled heat source.

Fourth, a source of vacuum with appropriate controls and conduits for supplying holding means to locating devices and to transfer mechanism.

In its present form the folding-in machine is semi-automatic, that is, stock for liners and cover is loaded manually into the proper gages by an operator who must start the machine to initiate each cycle. This machine can also be arranged to feed itself from properly aligned stacks by means of additional transfer units and thus become fully automatic. This extension of the machine's function, whether used or not, does not affect the nature of the method claimed as an invention, since this would be a natural and obvious step to take where conditions require maximum production. Similarly a transfer mechanism could be placed at the discharge end to take the finished work from the sealing and smoothing machine and forward it to the next operation. This invention is a novel and economically worthwhile process without these extensions. After the operator starts the folding-in machine, the process continues as follows without further attention:

The liner, held in place in its adjustable gage, is carried down onto the cover, which has been placed face down in its adjustable gage directly over the working center of the machine. Automatic registration of liner and cover takes place and is immediately followed by the folding-in of the cover margins, forming of corners and marginal pressing. Pressing quality and activation of adhesive is done by adjustable control of heat and time. The degree of heat is set by means of an assembly of electric heaters placed adjacent to the working center and regulated by an adjustable thermostat. Amount of time that the adhesive is under influence of heat is regulated by an adjustable timer which holds the pressing process stationary at this point for however long is required, usually a few seconds or less. After the desired interval the folding-in mechanism releases the folded-in cover so that it is free to be transferred.

At this point only the margins and corners are properly cemented, the inside area being loose. The margins and corners, although cemented together, are not even in appearance due to necessary joints in the forming plates. Corners may be a little too bulky. More pressing, sealing and smoothing must take place to develop an acceptable cover. It is possible to do this further step right on the folding-in machine but this would approximately double the time needed per piece and, therefore, would make the use of heat sensitive adhesives impractical from a cost standpoint. The semi-finished piece must be removed at once from the folding-in machine to make way for the next cycle of operation.

The transfer unit vacuum holding arm, having previously moved in over the work center, now drops to the semi-finished cover, picks it up and places it on the receiving belt of the sealing and smoothing machine, clearing the work center of the folding-in machine.

The liner locating gage on the folding-in machine has been released and made available for reloading early in the work cycle and before marginal pressing is completed. This important feature allows the operator to load the liner without stopping or interfering with other machine operations. Thus no working time is lost for this loading.

However, the cover locating gage is not available until the transfer arm clears out the previous piece. At this point the folding-in machine stops automatically and the operator now loads the cover, and restarts machine for the new cycle. It is possible to do this automatically with transfer mechanisms of several varieties as previously noted, thus making the operation completely automatic. However, in its present form, the folding-in machine runs intermittently under operator control and is manually loaded. The semi-finished work pieces are automatically taken from its work center by a transfer arm and placed on the receiving belt of the sealing and smoothing machine.

The transfer arm is mechanically operated by means of properly timed cams and levers; constituting an auxiliary machine which for convenience is attached to the side frame of the folding-in machine. This mechanism derives its power and synchronization from the extended main shaft of the folding-in machine. The transfer arm carries on it and is itself the conduit for, a plurality of suction cups which are the means of picking up and holding the work piece during its motion from one unit to the next. This mechanism also includes a cam and lever to actuate at the proper instant a vacuum relief valve which allows the work piece to drop off when correctly located over unit No. three.

The work piece has now been dropped on the receiving belt of the third unit, the sealing and smoothing unit. In its preferred form, as will be described, this unit or machine runs continuously, the speed being set so the work pieces taken from the folding-in machine are processed continuously without any possibility of overlapping. The machine consists of two belts running horizontally one above the other, the lower surface of the top belt touching the top surface of the lower belt. Each belt is driven by a power roll at the far end and has an adjustable idle pulley at the end nearest the folding-in machine. The lower belt extends outward beyond the top belt far enough so as to act as a moving receiving platform for each partially finished work piece. The upper belt driving roll is placed approximately on top of the lower belt driving roll and both are chain driven from a common gear box. Direction of motion is such that the touching surfaces of both belts move from the folding-in machine towards the driving rolls. Both belts operate at the same linear velocity. From this arrangement it is seen that a work piece from the transfer arm that is dropped on the extended lower belt is soon trapped between the touching surfaces of both belts and is carried in this confined space to the driving end.

Heating units are so disposed above and below the area where both belts are in contact that they touch and heat the belts. The lower heating unit is fixed and acts as a platform for both belt surfaces and the upper heating unit, which latter lays directly on the two belts as they pass between. The upper heating unit is prevented from sliding along the moving belt by suitable stops but is free to move vertically so as to accommodate work pieces of varying thicknesses without adjustment. The degree of heat supplied is regulated by separate adjustable thermostats, one for each heating unit. This allows the exact heat necessary to suit whatever adhesive and material combination is used. The amount of time under heat is regulated by the length of heated belt and linear speed. This is not necessarily variable as a good compromise of length and speed is selected and in practice left undisturbed. As the work piece passes through this hot confined space between the two belts, it is further heated and smoothed, without losing the marginal folds and corners previously made. As soon as the work clears the belts at the far or driven end it is picked up by a set of two resilient pressing rolls which iron out any remaining irregularities and insure that the adhesive bond is effected over the entire work piece. These rolls are also chain driven from a common gear box and the upper roll is made adjustable in its journals so that more or less pressure can be exerted as needed. After passing through these final smoothing and pressing rolls the work piece is ejected to a discharge chute and is either stored or removed to the next operation.

The sealing or smoothing unit is very important to the practical success of this method. It takes time to allow the heat to work into and activate the adhesive. If the work piece had to remain in the folding-in machine the length of time needed for completion, the process would be so slow as to be uneconomic. By automatically taking the work out of the folding-in machine, partially finished, and finishing the job in a second closely coordinated machine, the whole operation proceeds at a fast pace and with considerable saving in labor over previous methods.

In the accompanying drawings:

FIG. 3 is a perspective view showing the folder blades with the cover blank locating gages removed and with two typical sets of folder blades, one set for square corners and one set for round corners;

FIGS. 3A and 3B are perspective views of the left front and left back folder blades used in forming square and rounded corners;

FIG. 4 is a perspective view with the folder blades removed and showing the pressing pad and the pad frame side bars as well as the mounting and actuating means for the folder blades;

FIG. 4A is a section taken on the line 4A—4A in FIG. 4 through the pad frame and shows the pad frame side bars mounted thereon;

FIG. 5 is a perspective view of the folder main frame with the cover blank locating gages and the folder blades, pressing pad and filler removed to show the heaters and the blade actuating means;

FIG. 6 is a perspective view showing the die head down and the folder blades in full folding position but with the folder lifting mechanism raised slightly to die retracting position;

FIG. 7 is a front perspective view of the machine with the loading table, front safety cover, and die head removed. The main shaft with all the actuating cams and main drive are all clearly shown as well as the actuating means for the crosswise and endwise folder blade actuating mechanism and also the folder blade lifting mechanism;

Figure 18:
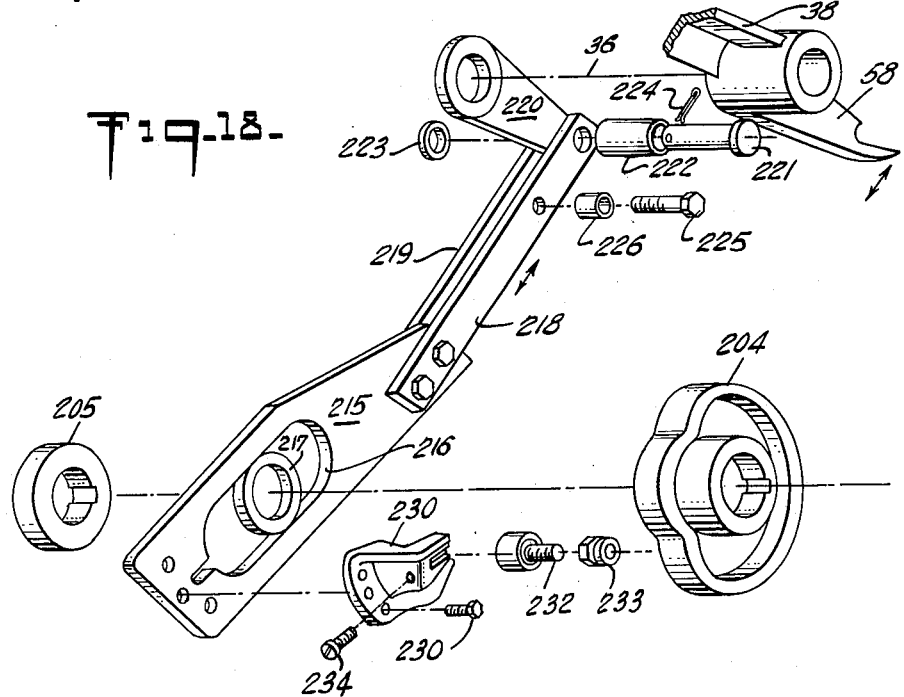
Figure 19:
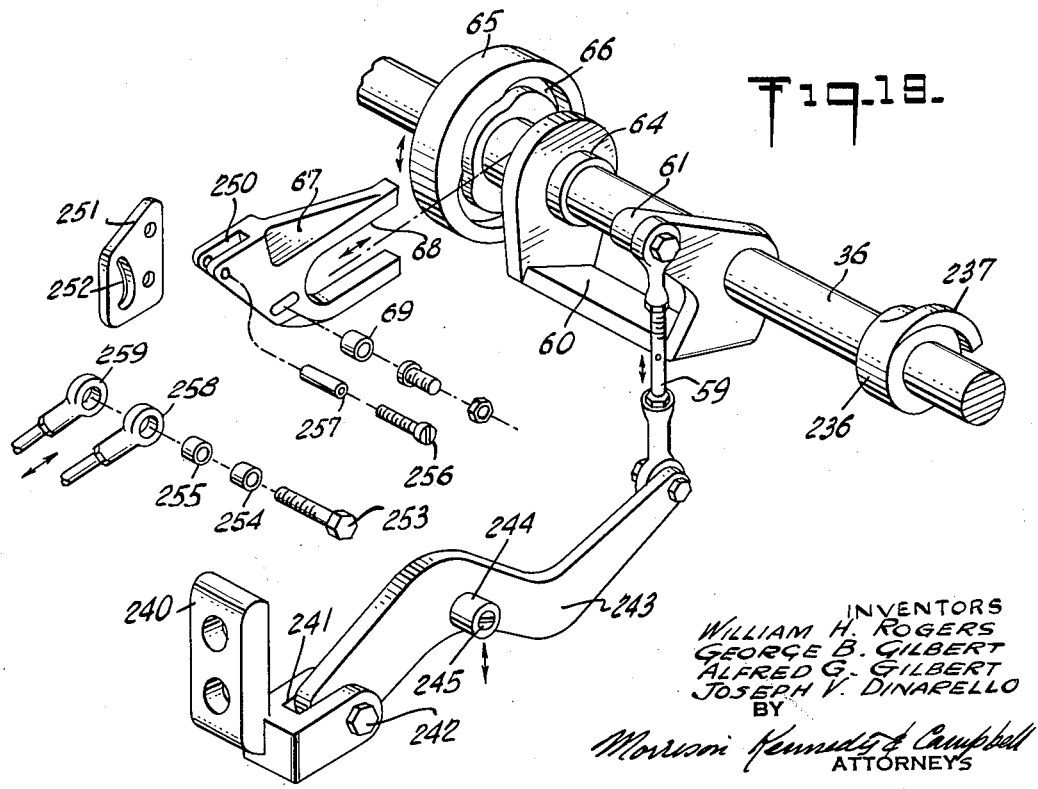

FIG. 8 is a rear perspective view of the machine and clearly shows the back shaft for actuating the die head and die. It also shows all the actuating mechanisms for the folder blade endwise and crosswise motion and the folder blade lifting motion as well as the main shaft and actuating cams. Only a portion of the die head is shown in this view;

FIG. 9 is a perspective view of a portion of the right side of the machine and clearly shows the cover transfer arm and its actuating mechanism on the main shaft. The loading table contained on the front side of the machine together with the two hand actuated safety switches are also shown in this view;

FIG. 10 is a perspective view of a portion of the left side of the machine and clearly shows the machine stop switch and timer actuating switch both actuated in timed relation by a suitable cam on the main shaft. This view also shows the electrical control equipment enclosure with the thermostatic heat control switch located on the top thereof and the timer cut out switch located on the side;

FIG. 11 is a top plan view of the die actuating mechanism in the die head for expanding and contracting the die;

FIG. 12 is a section through the die actuating mechanism as shown in FIG. 11 taken along the line 12—12 and clearly shows the die adjusting screw used for front and back adjustment;

FIG. 13 is a bottom plan view of the die actuating mechanism, with the die blades and die blade holders removed, and shows the two bars used to assure parallel operation of the die blades constituting the die;

FIG. 14 is a section through the die actuating mechanism as shown in FIG. 13 taken along the line 14—14 but in this section the die blades and die blade holders have been restored to show how they cooperate in expanding and contracting the die during normal operation;

FIG. 15 shows the main drive unit as driven by an electric motor with an electric brake contained therein;

FIG. 16 is a perspective view, taken from the right sides, of all the cams mounted on the main shaft and back shaft;

FIG. 17 is a perspective view, taken from the left sides, of all the cams mounted on the main shaft and back shaft;

FIG. 18 is a perspective view of the die head lifting and lowering mechanism driven by a cam on the main shaft and showing the interrelation of all the parts contained therein;

FIG. 19 is a perspective view of the die actuating mechanism driven by a cam on the main shaft to actuate a cam on the back shaft and thus produce a motion for expanding and contracting the die in timed relation to the rest of the motions. The view discloses all the parts and their interrelation in obtaining the necessary motions;

FIG. 20 is a perspective view of the folder bar lifting mechanism used to raise and lower the front and back folder moving bars;

FIG. 21 is a perspective view of the folder bar crosswise actuating mechanism;

FIG. 22 is a perspective view of the folder bar endwise motion actuating mechanism;

FIG. 23 shows the endwise folder motion cam on the main shaft, with the back crosswise motion cam on its left face and the front crosswise motion cam on its right face, and the means contained therein to move the two crosswise motion cams radially in relation to the endwise folder motion cam and to each other so as thus to vary the folder blade motions with respect to each other individually or with respect to each other in pairs or with respect to the endwise folder mechanism;

FIG. 23A shows in graphic form the various motions that may be obtained by the folder blades by varying the positions of the various cams shown in FIG. 23;

FIG. 24 is a wiring diagram of the control circuit used to actuate the machine and, since one complete revolution of the main shaft (360°) is used to complete the forming of one cover, the control circuit is used to start and stop the shaft after each individual revolution and in addition stop and start the unit automatically at the end of a predetermined length of time used as a pressing period for activating the adhesive;

FIG. 25 is a perspective view of the heat sealing unit to which the covers are transferred after formation and which then completely seals the entire liner in the cover by activating the adhesive over the whole area of the liner and pressing it onto the cover blank;

FIG. 26 is a cam timing chart for all the cams on the main shaft showing their relation to one another so as thus to portray the complete forming cycle based on one revolution (360°);

FIG. 27 is a chart showing the operations of the component parts as actuated by the cams on the main shaft during one complete forming cycle based on one revolution (360°);

FIGS. 28 to 37 are diagrams showing the operation of the interrelated parts in folding and forming the cover blank over the liner to better disclose the individual operations and end uses;

FIG. 38 is a section through a round corner forming device as used to control and stretch the cover blank at a round corner and thus evenly distribute the material over a 90° arc embracing the corner and allow the production of a flat corner;

FIG. 38A is a view similar to FIG. 38 but showing the cover edge completely folded in;

FIG. 39 is a top view of the round corner forming device and shows the cover blank as it is formed into and around said corner;

FIG. 40 is a perspective view of the round corner forming device detached;

FIG. 41 shows a section of a cover with a round corner as formed by the use of the device illustrated in FIGS. 38, 39 and 40; and FIG. 42 is a view similar to FIG. 41 but showing a corner as formed without the use of said device.

In actual operation certain parts of the apparatus must be closed or covered when in commercial use but in order to allow the component parts to be more fully shown most of said covers have been omitted. As a safety measure and one which is generally in use in industry, there are two separate hand switches on the table which must be actuated as well as a foot switch which will insure the operator's hands being free of the operating area as well as his being seated in front of the machine. These are safety features and are accordingly incorporated into the control circuit of the machine.

The cover blanks and liners that are used in the instant machine will be precut to size and the liners or the cover blanks, or both, will be suitably precoated with a heat activated adhesive to thus produce a complete unit on pressing. The embodiment of the invention shown herein uses heat as the sealing means and electronic sealing can therefore be substittued if desired and the timing relay can be used to control the cycle.

Attention is first directed to FIGS. 28 to 37, which are diagrams showing the various stages of operation in producing a cover in the folding-in unit. It will be understood that the diagrams are confined to one marginal edge only of the cover.

In FIG. 28: The pressing pad 20 rests on the filler 85 and the cover 401 is located in place thereon by the cover locating gages 21, the cover being slightly bent up and outwardly over the folder blades 24. The die 40 is being lowered into place directly onto the pressing pad 20 area with the liner 400 thereon by a continuous partial vacuum. It will be noted that the liner 400 is exactly of the same size as the die 40.

In FIG. 29: The die 40 has come down onto the pressing pad 20 and compressed the liner 400 onto the cover 401 to thus cause the outboard edges of the cover 401 to bend slightly upwardly and outwardly over the folder blades 24.

In FIG. 30: The folder lift mechanism has raised the front and back folder bars to thus cause the pad frame side bar 86, with the folder blades 24 and cover locating gages thereover, to be lifted up to tilt the outboard edges of the cover 401 up vertically around the edges of the liner 400 located on the face of the die 40.

In FIG. 31: The folder blade 24 has been moved in, by the folder motion endwise and crosswise actuating mechanism, to fold the upwardly tilted edges of the cover 401 inwardly over the liner 400 located on the face of the die 40 with a wiping motion to make a tight fold.

In FIG. 32: The folder blades remain in their inward position, as in FIG. 31, but the folder lift mechanism has raised the front and back folder bars up slightly more to release the die 40 so that it may be contracted for retraction from the folded cover.

Figure 33:
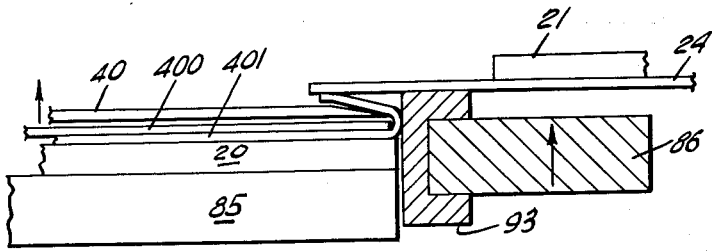

In FIG. 33: The folder lift mechanism stays where it is in FIG. 32 and the folder blades also stay in as in FIG. 31 but the die 40 is raised slightly to clear the liner 400 by overcoming the partial vacuum in order to allow the die to be retracted from the folds in the next motion.

Figure 34:
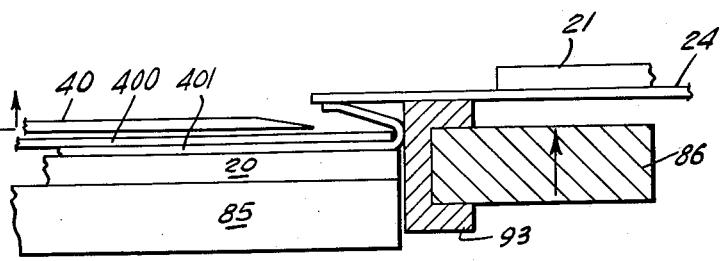

In FIG. 34: The folder lift mechanism stays where it is in FIG. 32 and the folder blades also stay in as in FIG. 31 but the die 40 now starts to retract and, as it retracts beyond the edge of the folder blade 24, it begins to lift upwards out of the folds to normal lifted position for reloading.

Figure 35:
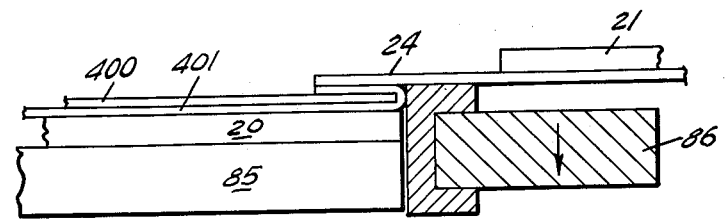

In FIG. 35: The folder lift mechanism is lowered to bring the folder blades 24 down onto the cover 401 and press its inwardly turned edges into sealing contact with the liner. It is during this operation that the machine is stopped in order to heat-activate the adhesive that has been applied as a coating on the liner or cover blank before assembly.

Figure 36:
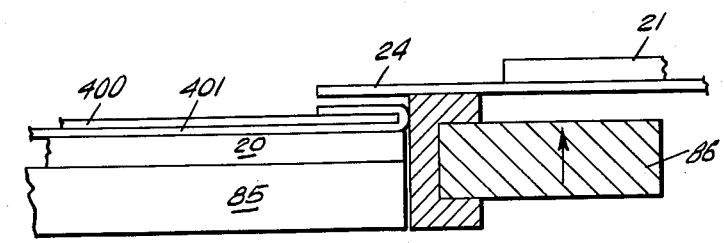

In FIG. 36: The folder lift mechanism again raises the front and back folder bars to allow the front and back crosswise and endwise motion to return the folder blades 24 to their retracted position.

Figure 37:
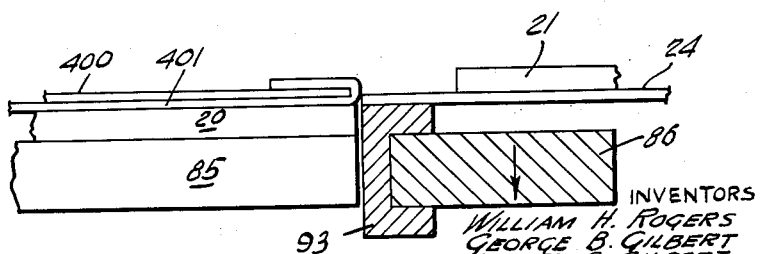

In FIG. 37: The folder lift mechanism has been lowered and returned to its normal position ready to receive the next cover for forming after the previous one has been removed by the transfer arm.

Before going into a detailed description of the parts, it may be helpful to make a few general observations with respect to some of the principal mechanisms.

The Main Shaft

The main shaft extends longitudinally of the machine and is mounted at its opposite ends in bearings supported from the top bed of the machine. The machine is so designed that one complete rotation of said main shaft will result in one complete operational cycle of the folding-in unit to produce a cover preparatory to its transfer to the heat sealing unit. The main shaft is driven by an electric motor at a slow speed and is equipped with an electric brake which will stop the motor when the current is turned off. Such an electric drive unit is very versatile and flexible in its operation, permitting the main shaft to rotate at a slow constant speed and still have the ability to stop almost instantaneously when necessary. In actual operation, the machine will produce up to 8 covers per minute depending upon the time cycle employed for activating the adhesive to seal the infolded edges to the liner. In addition, all of the operational cams are mounted on the main shaft in proper angular relation to complete the normal cycle of operation and thus make it relatively simple to change the cycle when it is necessary.

Folder Bar Lifting Mechanisms

The machine is equipped with front and back folder bars which extend across the whole front and back of the machine and which constitute the nucleus of the whole folder blade operation. The lifting of the bars is accomplished by two folder lift cams on the main shaft, each of which actuates an arm on a shaft extending through the machine from front to back and containing levers at both ends which engage adjustable lift stops on the front and back folder bars, allowing the adjustment of the rise and fall of the folder bars within very close tolerances. The cam followers which are carried by the arms are also adjustable and the cams themselves may be changed to thus give extreme flexibility. This mechanism lifts the folder blades up to fold the marginal edges of the cover blank into perpendicular relation to the liner, then fold said edges inwardly over the liner, after which the blades are brought down to press the inturned edges into sealing contact with the liner.

Folder Bar Crosswise Actuating Mechanism

This mechanism moves the front and back folder bars inwardly towards the center of the machine and, in doing so, moves the folder blades contained thereon so as to fold the edges of the cover blank over the liner in a straight-line motion from front to back. This motion is caused by two cams formed with suitable slots on the endwise folder motion cam. They are so mounted that they may be circumferentially adjusted with relation to one another and in addition with relation to the endwise folder motion cam to allow extreme flexibility in the operation of the folder blades.

Folder Blade Endwise Motion Actuating Mechanism

This mechanism moves four endwise motion actuating links contained in sliding ways in the front and back folder bars. The links are actuated by levers which oscillate back and forth on shafts contained in the bed of the machine. The right hand shaft (from front to back) actuates the two right hand links while the left hand shaft actuates the two left hand links. The actuation is only possible through the use of forked levers which allow the link actuating blocks to move up and down and back and forth therein and thus transmit the motion to the links regardless of the position of the folder bars in reference to the shafts and levers. This mechanism is actuated by the endwise motion cam on the main shaft. The motion is used to move the four folder blades inwardly towards center of the machine so as to fold over the edges of the cover blank onto the liner and seal them thereon.

The Die Actuating Mechanism

This mechanism is actuated by a cam on the main shaft driving a cam on the back shaft to cause the four shoes making up the die to extend and retract in timed relation to the other folder operations.

The Die Head Actuating Mechanism

The die head raising and lowering mechanism is also actuated by a cam on the main shaft and causes the die head with the die depending therefrom to be lowered and lifted in timed relation to the other folder operations.

The Cover Transfer Mechanism

The cover transfer mechanism is actuated by a series of cams contained on the main shaft to cause the transfer arm to be moved over and pick up the cover after it has been formed and transfer it to the heat sealing unit.

The Heat Sealing Unit

The heat sealing unit is adapted to be driven at various speeds and takes the formed cover and passes it between two continuous belts which carry it past thermostatically controlled heating units which cause the complete liner to be sealed in the cover. In addition, there is a pair of final pressure rolls which iron out all unevenness in the cover.

The Vacuum Supply and Control Unit

The die is partially vacuumized continuously to retain the liners thereon while the vacuum supply to the transfer arm is controlled by a valve operated periodically and in timed relation by a cam on the main shaft.

With these foregoing motions in mind, it is now possible to derive a better understanding of the complete machine.

Figure 1:
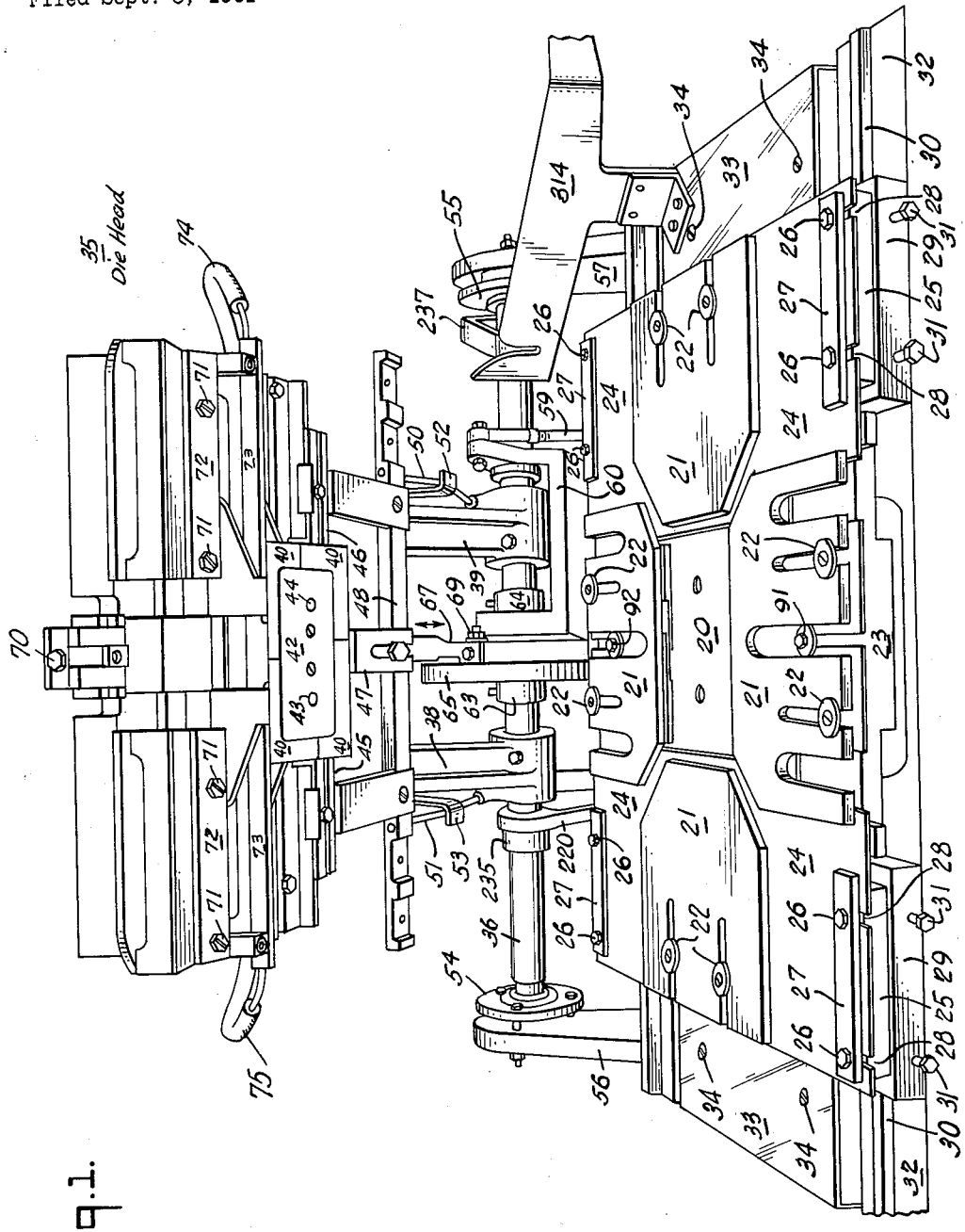
FIG. 1 is a perspective view showing the folder blades positioned for loading of a cover blank therein and the die head lifted up to loading position ready to receive a liner.

FIGURE 1 is a perspective view of the folder blades positioned for loading of a cover blank and the die head lifted up to loading position ready to receive a liner.

The pressing pad 20 (which is of laminated construction) is designed to receive the cover blank and to be the resilient member for backing up and holding the cover blank and liner during the pressing operation. The size of the pressing pad is the end size of the cover to be formed and it is therefore the same size as the die that is lowered upon it to hold the liner and cover blank during the forming operation. The cover blank is larger than the pressing pad and the cover locating gages 21 are so placed in reference to the pressing pad 20 as to give the right marginal edges over and beyond the pressing pad 20 to allow them to be folded up and over the liner. The cover locating gages are also used as stiffening members during the folding operation and therefore serve a dual purpose. The gages 21 are rigidly held in place in the folder main frame 23 by mounting and adjusting screws 22.

The folder blades 24 are mounted directly under the cover blank locating gages 21 and are attached to the folder moving block spacer 25 by means of studs 26 through flat washers 27 to thus anchor them thereon. The folder blades 24 are equipped with slots 28 in order to provide adjustment for centering and alignment. The folder moving block spacer 25 is attached to and actuated by the folder moving block 29 which is in turn mounted on the folder moving bar 32 and actuated by the endwise motion actuating link 30, being fastened thereto by means of studs 31. It is obvious therefore that as the folder bars 32 move up and down (one on front side and one on rear side), the whole folding table will move up and down with it, as the folder main frame 23 is resting on the folder moving blocks 29. In addition, as the links 30 are actuated back and forth, they will move the folder blades 24 endwise by means of the folder moving block 29 and folding moving block spacer 25; and, as the folder bars 32 move crosswise they will transmit a similar motion to the folder blades. These motions will therefore be used first to raise the edges of cover blank up around the liner and then to fold the cover blank in over the liner and the die and later, upon die removal, allow the pressing of the inwardly folded edges of the cover blank downwardly onto the liner on lowering the blades. It will be noted that the bed portions of the machine are covered with the bed covers 33, held in place by screws 34, to keep out dirt and dust and unauthorized tampering with the mechanism contained in the bed.

The swinging die head 35 contains the die head frame 37 with two yoke arms 38 and 39 mounted on the back shaft 36. The die 40 is made up of four segments, each being individually movable by means of die holders 41 in order to extend and retract the die before and after the cover folding operation. The liner is mounted on the die cover plate 42 and held thereon by means of vacuum applied through holes 43 and 44 and until it has been deposited into the cover. The liner is held in proper position on the die cover plate 42 by means of the side gages 45 and 46 and back gage 47 on gage mounting block 48. The gage mounting block 48 is yieldably mounted on the die head frame yokes 38 and 39 by means of rods 50 and 51 and held in proper adjustment by stops 52 and 53 on the yoke arms 38 and 39. When the die is lowered, the gage bars are lifted up out of the way by contacting the cover blank locating gages 21.

The back shaft 36 is mounted at its opposite ends in self aligning bearings 54 and 55 and these bearings are anchored in the frame extension arms 56 and 57 to thus form a rotating member at the rear of the frame for die actuation and die head tilting. The tilting of the die head is caused via the die head actuating arm 58, as will be described later on. The die actuation, to thus cause the die 40 to extend and retract, is caused by the link 59 which is actuated (as will also be described later) in a reciprocating motion to thus cause the motion transmitting yoke 60 to be oscillated in a rotary manner through the arm 61. Such motion is transmitted to a sleeve 62 mounted on back shaft 36 and retained against endwise shifting by collars 63 and 64 and having the die actuating cam 65 suitably fastened thereto at one end and motion transmitting yoke 60 at the other end, so as thereby to permit the assembly to oscillate back and forth on said shaft 36 as a unit (see also FIG. 8). The oscillation of the cam 65, with the square cam slot 66 formed therein, transmits a reciprocating motion to the die actuating yoke 67 which contains a yoke that slides over the sleeve 62 and a cam follower 69 mounted on its left face to engage in the cam slot 66 to produce the actuating motion for the die 40. The sequence of operation is to lower the die head, with the die extended onto the pressing pad, then form the folds of the cover blank over the die, retract the die and lift it back up into place for loading with a new liner.

The die head 35 contains on its front face a front and back die size adjusting nut 70 and lengthwise die size adjusting studs 71 and 72, whose operation will be described later on in conjunction with the disclosure of the die extending and retracting means. The vacuum supply to the die cover plate 42 for retention of the liner thereon is through the vacuum distribution line 73 and the hoses 74 and 75 connected thereto.

Figure 2:
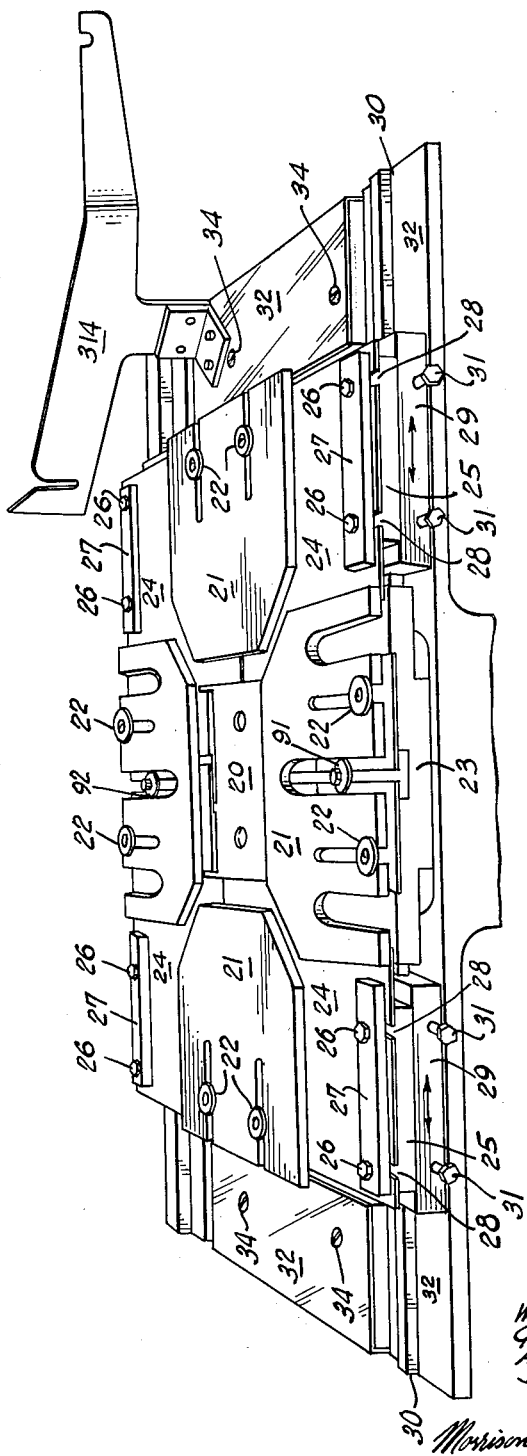
FIG. 2 is a perspective view with the die head removed and the folder blades moved inwardly and downwardly to full folding and sealing position.

In FIG. 2, the die head has been left off and the folder mechanism is shown with the folder blades closed to full folding position and the folder moving bars down in folding position. The endwise motion links 30 have moved the folder blades inwardly endwise and the crosswise motion devices have moved the folder bars 32 inwardly from front to back to thus close all the folder blades in proper sequence to full folding position. The folder lifting mechanism has also lowered the entire assembly onto the pressing pad.

In FIG. 3, the cover locating gages have been removed and the folder mechanism is shown with the folder blades in loading position with the folder lifting mechanism down in loading position also. This view is intended to show the construction and assembly of the folder elements in order to clearly present the means used to actuate the folder blades 24 and the spacer and anchoring means used in assembling the components. The two folder blades 24a and 24b shown in FIG. 3A disclose how the ends which overlap are formed in order not to change folder blade thickness. The cross hatched areas 76 and 79 are milled to ½ plate thickness on the top side while the other two areas 77 and 78 are correspondingly milled on the bottom side to thus allow the blades to overlap or telescope with no change in thickness. It is also to be noted that the corner forming slots 80, 81, 82 and 83 are elongated in shape to form over the square corners without bulky folds. In forming square corners, the folder movement is arranged to first move the folder blades inwardly crosswise from the front and back towards the center and then inwardly endwise towards the center so as to form a square corner fold with a minimum of bulk ready for pressing. The two round corner folder blades 24D and 24C shown in FIG. 3B disclose how the ends which overlap are formed in order not to change the folder blade thickness, as in 24A and 24B and in addition disclose how the corners are formed and how the blades are actuated. In forming round corners, the motion is changed to move all four blades inwardly at the same time at 45° angles by arranging the crosswise and endwise blade movement to occur at the same time rather than in steps as in the square corner folding. How this is accomplished will be described later in relation to the main shaft operation.

In FIG. 4 the folder blades have also been removed to disclose the folder main frame and pad base and the framing around the pressing pad. The folder main frame 23 is resting on the folder moving blocks 29 and arranged to be moved up and down thereby as the folder lifting mechanism moves the folder bars 32 up and down. The frame 23 is built around the pressing pad 20 and is therefore guided in its vertical movement thereby. The pressing pad 20 has the pad frame side bars 86 and 87 on its left and right hand sides and the pad frame T-bars 88 and 89 on its front and back sides, the latter bars being held in place in the folder main frame by the studs 91 and 92. The complete periphery of the pressing pad is faced with a small channel shaped liner 93 cut into individual lengths and mounted on the faces of the pad frame side bars 86 and 87 and the ends of pad frame T-bars 88 and 89. The periphery of the folder main frame 23 is heated by means of electric heaters 94 and 95 to assist in keeping the assembly warm for sealing. In addition the pad base 90 is also arranged to contain thermostatically controlled heaters for sealing.

In FIG. 5, the pressing pad and filler have also been removed to further show the folder unit stripped down to the actuating mechanism.

In FIG. 6 is shown the die head lowered onto the pressing pad with the folder blades closed but with the folder lifting mechanism raised to die retracting position. The die 40 is under the folder blades 24, being actuated by the die holders 41. The folder blades later will be lifted up slightly more and the die 40 will then be retracted and lifted up to its normal loading position. The actuating mechanism for the die will be described later as a complete unit.

In FIGS. 7 and 8 are shown front and back views of the machine with the table removed and the front protective cover also removed to reveal the main shaft and drive unit. The main shaft 100 is mounted at opposite ends in bearings 101 and 102 mounted on the bed plate 103 and held up in place by means of a series of bolts, such as 104 and 105, to form a means for mounting practically all the drive and operating mechanisms and so synchronize the complete operation of the machine from this one shaft. The base of the machine consists essentially of two weldments 106 and 107 forming the two sides and having a series of angles 108, 109, 110 and 111 suitably fastened thereto to form a rigid frame upon which the bed 103 is placed.

The machine drive unit (also shown alone in FIG. 15) is mounted below and to the rear of the frame and consists of an electric motor 112 with an electrically controlled brake integrally mounted on the main shaft to stop the motor the moment the power is turned off. There is a small sheave 113 mounted on the motor shaft and driving a large sheave 114 through the belt 115 to rotate the shaft 116 which is mounted in bearings 117 and 118 on base 119. Shaft 116 has a worm 120 fixed to the shaft 116 between the bearings 117 and 118 to drive the worm gear 121 on the main shaft 100. The gear 121 is keyed to the main shaft and locked in place on the shaft by means of stud 122. The base 119 is slidably mounted on vertical rods 123 and 124 from the bed plate 103. The belt tension is adjusted by means of slots in the motor base 112 which is mounted on the motor mounting plate 125 located between the two weldments 106 and 107 and fastened thereto by bolts. The motor control will be described later in conjunction with the control circuit. It will be noted that the front end of the shaft 116 is partially milled away to allow a crank to be slid over the shaft for manually turning the main shaft for adjusting and setting up the machine.

The main shaft 100 has mounted thereon and keyed thereto a number of cams of various shapes and sizes and FIGS. 16 and 17 show right and left hand face views of the same cams in order to reveal the complete sequence of operation. Starting therefore with FIG. 16 and proceeding from left to right:

Electrical control cam 200 contains two control lobes 201 and 202 for operating the heating cycle timer switch and for stopping the machine to produce a single revolution of the main shaft 100.

Left folder lift cam 142 is used for controlling and actuating the left folder lift mechanism, as will be described later. The lobes on this cam are located on the other side.

Die head actuating cam 204 is used to raise and lower the die head from and to forming position.

Endwise folder motion cam 170 has a back crosswise folder motion cam 171 on one side (L.H.) and a front crosswise folder motion cam 169 on the other side (right).

Right folder lift cam 143 is used for controlling and actuating the right folder lift mechanism and it will be noted the lobes on this cam are raised from the face to cause a lifting motion. There is also a cam on the back face of cam 143 which is used to actuate the die actuating cam 65 on the back shaft 36.

Transfer arm lift cam 206 and vacuum valve actuating cam 210 are mounted on and fastened to the back side of the transfer arm swing motion actuating cam 213 by means of bolts 211 and 212 and therefore rotate therewith. It will be noted that cam 206 is used to keep the transfer arm lifted up until it is used to pick the finished cover off the pressing pad, at which time it is dropped down and then lifted right back up again. This is accomplished by cam roller 207 on transfer arm lift lever 209 which tilts said lever about pivot 208 and thus lifts the transfer arm. The vacuum valve actuating cam then acts to supply vacuum to the arm for transferring the finished cover to the heat sealing unit. These two units are located on and run in timed relation to the cam 213 which causes the transfer arm to swing over into lifting position and then swing it over to the right to unloading position, where the cover is released and dropped onto the heat sealing unit. A like unit may be duplicated or arranged to load the machine by installation on the opposite side of the machine if so desired.

Proceeding now to FIG. 17 and again starting from left to right:

Electrical control cam 200.

Left folder lift cam 142 has raised lobes to lift the folding mechanism.

Die head actuating cam 204.

Endwise folder motion cam 170 with back crosswise folder motion cam 171 on one side (left) and front crosswise folder motion cam 169 on the other side (right).

Right folder lift cam 143 with the actuating cam slot 215 contained in the back face (shown here) and used to actuate the die via back shaft 36 and die actuating cam 65.

Transfer arm swing motion actuating cam 213 with the vacuum valve actuating cam 210 and transfer arm lift cam 206 located on this face and fastened thereto by means of bolts 211 and 212.

The cams are all mounted on the main shaft 100 by means of keyways and anchoring studs with the exception of the front and back crosswise motion cams 169 and 171, which latter are mounted on the two faces of the endwise folder motion cam 170 and may be circumferentially rotated in relation thereto. The use of these cams in the various mechanisms will now be disclosed and later on the cam charts will be referred to as showing the actual relation of the various mechanisms and the changes that may be made thereto.

The folder bar lifting mechanism will now be described with reference to FIG. 20. There are two folder bars 30 used on the machine, one across the front and one across the back, and both are actuated simultaneously by means of this folder lifting motion mechanism. The two shafts 126 and 127 are fitted into the bed of the machine and run from front to rear at the left and right sides of the machine. The folder lift shaft on the left is designated 126 and the folder lift shaft on the right 127. Lift levers 128, 129, 130 and 131 are pinned to the shafts 126 and 127 for actuation thereby. The front levers 128 and 129 are joined to downwardly extending actuating arms 132 and 133 with slots 134 and 135 at their free ends. The actuating arms 132 and 133 also contain folder lift cam followers 136 and 137 adjustable in the slots 134 and 135 by means of adjusting studs 138 and 139 for cam follower 136 and adjusting studs 140 and 141 for cam follower 137. The cam followers 136 and 137 are arranged to ride on the left folder lift cam 142 and the right folder lift cam 143, respectively, to furnish an oscillatory motion to raise and lower the folder blade assembly with reference to the pressing pad. The adjustments provided at the lower ends of the actuating arms 132 and 133 are for leveling and synchronizing the action of the two sets of levers. The actual amount of lift transferred to the folder bars 30 is controlled by the four adjustable folder lift stops 144, 145, 146 and 147 on the bottom faces of the front and back folder bars 30 directly over the folder lift levers they engage. The left and right folder lift cams 142 and 143 are keyed and locked to the main shaft 100 and hence driven thereby in synchronism. The actual forms of the cams will be further described in connection with the cam chart to give the timing and motion transmitted to the folder bars. It may be noted here that the right folder lift cam 143 contains another cam on the back side which will be described later in conjunction with the die actuating mechanism.

The folder bar crosswise actuating mechanism will next be described in connection with reference to FIG. 21. This mechanism moves the front and back folder bars 30 inwardly towards the center of the machine, keeping them parallel at all times, to thus move the folder blades inwardly over the pressing pad and fold the cover inwardly over the liner. Here again there are two flat rectangular bars extending through the bed of the machine to tie the actuation of the two folder bars together and thus actuate them as a unit.

The left folder guide bar 150 and the right folder guide bar 151 are rectangularly shaped flat bars arranged under the folder bars 30 and movably attached at their front ends but anchored at their back ends to said bars by means of folder guide bar sliding way blocks 152, 153, 154 and 155 suitably fastened to the under faces of the folder bars. Said blocks have downwardly depending yokes 156, 157, 158 and 159 arranged to form actuating means to move the two folder bars back and forth towards and away from one another in perfect parallelism. The mechanism is actuated on the front side by means of three actuating arms 160, 161 and 162 combined into one actuating link and arranged to be mounted on the underside of the bed in an actuating link bracket 163 by means of bearing studs 164 and 165. The two upright arms 160 and 161 are arranged to accept on their outboard faces eccentric bushings 166 and 167 held in place by means of bolts and nuts to thus furnish actuating connections to the yokes 156 and 157 and still provide for adjustment of the actuating parts to maintain the parallelism of the front and back folder bars 30. The lower downwardly depending actuating arm 162 is arranged with a cam follower 168 on its left face to be actuated by the slot in the face of the front crosswise motion cam 169 located on the right hand face of the endwise folder motion cam 170. The back folder bar 30 is also driven by a similar arrangement, as shown in the rear view of the machine (FIG. 8), and is driven by back crosswise motion cam 171 located on the left hand face of the endwise folder motion cam 170. The bracket on the back end is turned through 180° to position the actuating arm on the right side in order to engage the cam 171.

The endwise folder motion actuating mechanism will now be described with reference to FIG. 22. This mechanism is arranged to move the folder blades in and out towards and away from the center of the machine and so fold the cover over the liner. As in the other motion mechanisms, there are two shafts arranged in bearings in the base 103 of the machine to coordinate and synchronize the back and front actions. The left endwise motion shaft 178 and the right endwise motion shaft 179 are provided at their opposite ends with forked actuating levers 172, 173, 174 and 175 pinned thereto against turning and arranged to be actuated by an arm 176 depending from the forked actuating lever 172 and having a cam follower 177 inwardly facing to engage a circumferential cam slot contained in the peripheral circumference of the endwise folder motion cam 170. The cam slot is arranged to impart an oscillatory motion to the forked actuating lever 172 which in turn imparts an oscillatory motion to the motion transmitting block 180 contained in a slot in the yoke portion of the lever. This arrangement accommodates the up and down folder motion which takes place with reference to these actuating levers as well as the in and out folder motion which also takes place with said levers. In slots formed in the tops of the front and back folder bars 32 are arranged the endwise motion links 30 which are pinned to the motion transmitting blocks 180 mounted in the yokes of levers 172, 173, 174 and 175 and which thus furnish the endwise folding motion by being driven back and forth in the slots and moving the folder moving blocks 29 fastened thereto by means of studs 31. The true transmission of equal motion is also caused by tying the lower outboard ends of the forked actuating levers 172, 173, 174 and 175 together in the front and back by means of yokes 182 and 183, which are in turn tied together by a connecting bar welded to the yieldably anchored plate 184. The plate 184 (see FIGS. 7 and 8) is yieldably mounted on the side plate 107 of the machine by means of the universal mounting means 185 and 186 which act as a hinge to thereby allow the connecting bar to only move up and down on an even keel. It can be seen that this arrangement will allow and insure the transmittal of an even amount of motion and thus make the actuation of the bars 30 in the folder bars 32 the same at all times. As will be clear from FIG. 22, the universal rod ends on the extremities of the yokes 182 and 183 may be adjusted to insure an even length and placement of the bars 30. In addition the placing of the folder moving block in relation to the bar 30 and anchoring it thereon by means of studs 31 provide an additional adjusting means.

It may be well to state here that the back crosswise motion cam 171 mounted on the left face of the endwise folder motion cam 170 and the front crosswise motion cam 169 mounted on the right hand face (as shown in FIG. 7) are radially adjustably mounted on said cam 171 in order to be able to change the sequence of operation of the folder blades 24. FIG. 23 shows the main shaft 100 mounted in the bearings 101 and 102 with the endwise folder motion cam 170 keyed thereon and containing two hubs for centering and mounting the front and back crosswise motion cams thereon by means of bolts and nuts 187, 188, 189 and 190. The crosswise folder motion cams 169 and 171 have a slot for circumferentially adjusting the cams and fastening them in place by means of bolt 189 and nut 190 and have three holes for anchoring by means of bolt 187 and nut 188 to position them on the two faces of cam 170 to thus vary the sequence of operation of the folder blades. In FIG. 23A, the box shows in diagrammatical form the different sequences of operation that may be achieved by varying the crosswise motion cams radially in reference to the endwise folder motion cam to achieve these motions. Starting at the left hand illustration and moving to the right the following sequence can be obtained.

Left: Front and back crosswise motion cams 169 and 171 will move the folder blades 24 first inwardly in the crosswise direction (1) towards the pressing pad and then the endwise folder motion cam will move the folder blades 24 inwardly in an endwise direction (2) toward the pressing pad to complete the folding of the cover inwardly over the liner and die.

Center: Endwise folder motion cam 170 will move the folder blades 24 first inwardly in an endwise direction (1) towards the pressing pad first and then the front and back crosswise motion cams 169 and 171 will move the folder blades 24 inwardly in a crosswise direction (2) towards the pressing pad to complete the folding of the cover inwardly over the liner and die.

Right: Endwise folder motion cam 170 and front and back crosswise motion cams 169 and 171 will move the folder blades 24 inwardly all at the same time to produce the equivalent of a movement, as indicated, of 45° towards the pressing pad to complete the folding of the cover inwardly in one operation.

The left and center movements described above are used in conjunction with folder blades 24A and 24B shown in FIG. 3A for forming square cornered covers and the forming sequence is varied to form the cover in over the liner in either of the two directions as desired.

The right movement described above is used in conjunction with the round cornered folding blades 24C and 24D shown in FIG. 3B for forming round cornered covers only and, due to the method of control the cover material at the corner forms a very smooth corner. This will be described later on in another figure. It should be noted here that when round corners are formed the pressing pad and die contour are formed to match and therefore operate in unison to give evenly distributed flat corners.

The die head lifting and lowering mechanism is shown in FIG. 18 as well as in FIGS. 7 and 8 and will now be described with reference to these three figures. The die head actuating cam 204 mounted on the main shaft 100 and keyed thereto serves as the means of actuating this part of the mechanism and in addition the back side of said cam serves as a sliding guide for the whole operating mechanism. The die head actuating yoke 215 contains an elongated guide slot 216 for sliding contact with the flat sides formed on the die head actuating yoke bearing 217 rotatably mounted on the shaft 100. Fastened at the upper end of the die head actuating yoke 215, by means of the two bolts 227 and 228, are the two die head actuating links 218 and 219 spaced apart near their upper ends by the spreader collar 226 which is held in place by stud 225 screwed into the link 219. At their upper extremities, the two links 218 and 219 are connected to the die head actuating link guide arm 220 which is loosely mounted on the back shaft 36 and held in place by the die head frame yoke bearing 38 on one side and by the collar 235 on the other side to thus guide and hold it in place on the back shaft 36 in reference to the die head actuating arm 58. The die head actuating thrust pin 221 and its bearing collar 222 are put through the ends of the two links 218 and 219 and the link guide arm 220 and the thrust pin held in place by the cotter pin 224 to thereby furnish the actuating means for lifting and lowering the die head by engaging the milled slot in the end of the die head actuating arm 58. The bearings in the two yoke arms 38 and 39 of the die head frame are drilled to receive the back shaft 36 and have means thereon for anchoring said yoke arms 38 and 39 on said shaft 36 in order that the yoke may be actuated as a unit. The lower end of the die head actuating yoke is equipped with a die head actuating cam follower bracket 230 fastened to said yoke by means of studs 231 and said bracket 230 has a cam follower 232 held in place in the slot in the bracket 230 by the nut 233 and adjustable in said bracket by an adjusting screw 234. The large collar 205 is placed on the opposite side of the yoke assembly and mounted on the shaft 100 to thus furnish in conjunction with the cam 204 the retaining means for the assembly. In operation, the cam follow 232, mounted in the bracket 230 and adjustable therein by means of screw 234 with the assembly mounted on the die head actuating yoke 215 by means of bolts 231, will contour the cam 204 and cause the yoke to move back and forth in the slots 216 and thus transmit the motion by means of the links 218 and 219 and the guide arm 220 and pin 221 to the die head actuating arm 58 to actuate the head up and down in timed relation to the shaft rotation. The timing of this mechanism in its relation to the other mechanisms will be shown on the cam charts. The shaft 36 also has a stop 236 (see FIG. 8) anchored thereto and arranged to stop the rotary motion of the shaft 36, when the die head has been raised to a position just beyond the vertical (when it is desired to clear the table or work on the die head actuating linkage), by engaging the stop arm 237 against the plate 238 welded onto the machine frame.

The die actuating mechanism for extending and retracting the die is also shown in FIGS. 7, 8 and 19 while the die itself and its operating mechanisms are shown in FIGS. 11, 12, 13 and 14. In describing this mechanism, it is best to refer to FIGS. 7, 8 and 19 and start from the main shaft 100 again. The die actuating arm 243 has a cam follower 244 held in place by bolt 245 and arranged to follow the cam slot 215 contained in the rear face of the right folder lift cam 143 to thus impart a reciprocating motion to the die actuating link 59. The end of the die actuating arm 243 is retained in the yoke 241 of a bracket 240, anchored to the bed 103 of the machine by means of the bolts 242, to thus pivot about this point. The die actuating link 59 is arranged to transmit reciprocating motion to the die actuating yoke 60 which is rotatably mounted on the shaft 36 and actuated by the arm 61, and said yoke 60 contains a sleeve 62 fitted into its outboard end to thus translate the reciprocating motion of the link 59 into rotary motion of the sleeve 62. The die actuating cam 65, containing the cam slot 66, is fastened on said sleeve 62 and rotates therewith to thus again change the rotary motion of the sleeve and cam into reciprocating motion via the die actuating yoke 67 having an elongated slot 68 slidably mounted over the sleeve 62 and carrying the die actuating cam follower 69 adjustably mounted in a slot in the yoke 67 and arranged to fit into and be actuated by the slot 66 in the cam 65. The die actuating yoke 67 has a further slot 250 on its back side arranged to take the connecting link 251 which is mounted therein by means of the stud 256 and bushing 257. The connecting link 251 has an arcuate shaped slot as an adjusting and leveling means for transmitting the reciprocating motion to the die expanding and retracting mechanism contained in the die head through the links 258 and 259 mounted in said slot 252 by means of the bolt 253 and spacer bushings 254 and 255 and a suitable nut on the far end.

Proceeding now to FIGS. 11 and 12: FIG. 11 is a top view looking down on the die actuating mechanism with the die head actuating mechanism base plate removed. FIG. 12 is a section taken on the line 12—12 in FIG. 11 with the base plate removed. To further disclose the die actuating mechanism, the two die actuating links 258 and 259 are connected at their opposite ends to the working slide mechanism composed of the two bars 260 and 261 arranged on either side of the guide bar 262 and connected at the back end by the bridge 263 and at the front end by the bridge 264. The bridge 264 is arranged with a suitable center hole containing the adjusting screw 70 which has a collar and is locked in place in the bridge by means of the locking nut 266. The adjusting screw is threaded into the adjusting block 267 and thus upon turning will move the block backwards and forwards to adjust the die actuating shoes 270, 271, 272 and 273 through the connecting links 268 and 269 and actuate levers 274 and 275. The design of the levers 274 and 275 is such as to produce equal movement of the die actuating shoes. The die actuating shoes 270, 271, 272 and 273 and arranged to slide in the diagonal guideways 276, 277, 278 and 279 contained in the die actuating mechanism base plates 280 and 281 to furnish a method of positioning the die carriers and thus change the position of the die blades mounted thereon and in consequence the actual die size. This adjustment is only for die sizing and in no way affects the amount of movement transmitted by the links 258 and 259 which actuate the mechanism.

FIG. 13 is a bottom view of the die actuating mechanism with die blades, die cover, vacuum apparatus and die actuating mechanism removed, and FIG. 14 is a slightly enlarged section through FIG. 13 at 14—14 to show the die expanded but has the die actuating mechanism and vacuum supply as well as the die cover plate removed. In these two figures, the two die actuating mechanism base plates 280 and 281 are shown and contain the diagonal guideways 276, 277, 278 and 279 with the die actuating shoes 270, 271, 272 and 273 therein to thus actuate the die carrier plates 282, 283, 284 and 285 which are attached thereto. In order to insure parallel operation of the die plates that are attached thereto, the die carrier plates 282, 283, 284 and 285 are arranged with slots 286, 287, 288 and 289 in their back faces to accept guide bars 290 and 291 and are arranged to slide back and forth thereon as the dies are actuated by the shoes from above. The die blades 40 are suitably arranged on the die carrier plates 282, 283, 284 and 285 by means of die holders 41 positioned in the slots marked (x) and held in place thereon by means of the die holder clamping channels 72 and studs 71 to thus also afford a means of lengthwise die adjustment. The die blades 40 are fastened to the die holders by means of small countersunk screws and nuts in order to be flush with the face of the die. The die blades 40 are chamfered on their outer edges and milled (like the folder blades) to half their thickness where they overlap on retracting. It will be noted that the die head actuating mechanism base plates 280 and 281 are in turn mounted on the base plate mounting plate 293 by means of studs 292 and spacer bushings 293 to provide space for the equipment disclosed in FIGS. 11 and 12. The base plate mounting plate in turn is provided with two upstanding cylindrical shaft sections 294 and 295 which slide up into the two vertical hubs contained on the die head 35 and are suitably positioned therein and locked by means of set screws 296 for proper die placement and adjustment on lowering onto the pressing pad.

In FIG. 9 is shown a view of the right side of the machine with the loading table in place and with the two hand actuated switches mounted thereon and with the folding mechanism, back shaft and die head actuating mechanism and die head removed. In essence, the figure is intended to show the location and operation of the transfer arm for transferring the folded cover to the heat sealing unit for completion of sealing. The actuation of the lifting arm 209 is disclosed in FIG. 16 with the exception of the guide bar 316 which is mounted on the side plate 107 by means of spacers and studs 317 and 318. The action of the vacuum control valve for the transfer mechanism is also shown as far as the actuating cam 210 is concerned and this in turn operates the actuating lever 321 and thus actuates the valve 320 to control the vacuum on the transfer arm. Adjustment is provided on the valve actuation by means of screw 322 located on the arm 321 and locked in place thereon after adjustment. The vacuum supply to the valve is provided by hose 323 and from the valve to the transfer arm tube 311 by means of tube 324. The swinging of the transfer arm is effected by the slot contained in the face of the transfer arm swing actuating cam 213 mounted on and actuated by the main shaft 100. The slot in the cam actuates the swing motion lever 300 about the pivot point 301, against the tension of the spring 319, by means of the cam follower 302 to transmit a reciprocating motion through the link 303 to the pivot shaft actuating arm 304, mounted on the pivot shaft 325, to produce a pivotal motion of the arm 311 which carries the pickup tube 312 provided with the two suction cups 313. The combination of motions thus transmitted to the pivot shaft 325, which is mounted on the side plate 107 in the bracket 306 and fastened thereto by means of studs 307, is a vertical lift motion transmitted by the lift lever 209 through the collar 308 fastened on the pivot shaft 325 and a pivotal motion imparted by the swing cam 213 through the connections described above, with the result that the transfer arm first moves to the loading position over the pressing pad and is then lowered down onto the cover, the vacuum valve being actuated to pick up the cover, and the arm then raised with the cover thereon and swung over to the right to unloading position, the vacuum valve again being actuated to cut off the vacuum and allow the cover to drop onto the heat sealing unit. The bracket 314, fastened to the cover 33 by means of the angle 315 and suitable studs and bolts, is simply provided to form a guide and rest means for the transfer arm.

It is possible, if deemed desirable, to provide for automatic loading of the cover blanks and liner blanks by an arrangement similar to the transfer arm mechanism but arranged on the other side of the machine. The feasbility of this would depend upon the number of pieces to be run and the cost of the labor necessary to operate the machine. Under ordinary circumstances, with the machine as disclosed herein, it is possible to make up to 2500 large covers and up to 4000 small covers in one day.

In FIG. 24 is shown the wiring diagram of the complete unit and FIG. 10 shows a view of the left side of the machine with the micro switches actuated by the cams to control the machine cycles. In describing the actions of the wiring diagram and the functions controlled thereby, it is not deemed necessary to trace through the circuits wire by wire as the circuits are self evident.

The electrical control equipment enclosure 334, shown in FIG. 10, is used to house all of the control equipment with the exception of the safety hand and foot switches and the two micro switches. The power input to the machine is shown coming into the four-pole relay 341 as L1, L2 and L3 and this four-pole relay (one pole of which is used for control circuitry) is the main control relay used to operate the machine. The individual circuits used to operate the machine will now be independently described.

*1. Master Control Switch*

The switch 348 is used to energize all the circuits contained in the unit and must be closed before the machine can be operated.

*2. Motor Control Circuit*

(A) The operation of the motor 112 is directly controlled by the relay 341 through the thermal overload relays 342 and 343 and there is a magnetic brake on the end of the motor shaft to stop the motor almost instantaneously when the circuit to the motor is opened and the current cut off.

(B) Motor starting means. The two hand switches 335 and 336 contained on the table and the foot switch 337 are normally used to start the machine and are so arranged in the circuit as to energize the coil of the relay 341 and thus close the relay to energize and start the motor.

(C) Motor stopping means at the beginning of the pressing cycle (restarting after the pressing cycle) and at the end of a complete forming operation.

The micro switch 330 is actuated by the lobes 201 and 202 of the cam 200 (FIG. 10) and, being a normally closed switch, will complete the circuit to hold the relay 341 energized in series with foot switch 337 to thus furnish a parallel circuit for motor control. The lobe 201 of the cam 200 and the lobe 202 of the same cam will simultaneously operate both micro switches, lobe 201 opening the switch 330 to open the motor control circuit and stop the machine, and the lobe 202 actuating the switch 331, which is a normally open switch, to close and start the timing relay 340 which will continue to run for a preset time (from 1 to 15 seconds) and then close a set of contacts to again start the motor by means of relay 341, with the micro switch 330 closing its contacts and furnishing the holding circuit for relay 341.

(D) *Motor stopping means.* The micro switch 330 will next be actuated by lobe 202 to open the relay 341 control circuit and thus stop the machine (FIG. 10 shows this).

3. *Heater Control Circuit*

The heater control circuits are fed from the lines L1 and L3 and go through fuse box 344 to a variable setting thermostatically controlled heater switch 345 controlled by thermostat 346 to thus energize and control the heaters 347. The amount of heat that will be necessary for the pressing cycle can thus be varied and the length of the cycle can also be varied to give extreme flexibility in activating the adhesives used to bind the cover edges to the liner. In conjunction with the heating cycle, it might be well to bring out that electronic heating may be used, instead of the electric heating herein disclosed, and will necessitate no changes in circuitry but will simply mean that the electronic heating means will be mounted on the side of the machine and leads will be brought up to the applicators. This same method may be applied to the heat sealing unit (later to be described) and as a matter of economics one unit could be used to supply both the folding unit and the heat sealing unit. The adhesives that may be used in coating the liner or cover are many and varied as regards their ability to be activated as well as their holding ability.

In passing it may be well to make a few other pertinent statements:

Micro switch 330 (normally closed) will stop the machine when either lobe 201 or lobe 202 on cam 200 actuates it and thus furnishes the control means for automatically stopping the machine at the start of the pressing cycle and at the end of each forming cycle.

Micro switch 331 (normally open) will start the timer 340 which has a set of contacts that close at the end of a given time to close the starting circuit to relay 341 and thus start the motor 112 again, but micro switch 330 will immediately close and furnish the holding circuit until the machine stop at end of cycle occurs as above.

Load stops, occurring at end of cycle and caused by micro switch 330, may only be overcome to restart the machine by use of hand switches 335 and 336 and foot switch 337.

It is believed that the above description will give a complete disclosure of the circuitry and control means and its association and cooperation with the cams on the main shaft, and it is not therefore necessary to go into a detailed description of all of the electrical units, as these units per se are well known in the art.

In FIG. 25 is disclosed a heat sealing unit for completely sealing the liners in the covers. The instant invention was designed, first to fold and seal the folded edges of the covers only and then feed them to the heating unit for the complete sealing of the liners to the covers. By designing the two units in this manner, it is possible to eliminate the backup of the die and the time necessary to seal and press the complete unit and in addition it simplifies the folder blade actuation. The partially sealed covers are therefore picked up by the transfer arm 311, as shown in FIG. 9, and delivered to the heating unit. The cover 350 is laid on the extended receiving portion of the endless belt 352 and proceeds along into and between said belt and the overlying endless belt 351, being carried by the two belts into the space between the two thermostatically controlled heating units 353 and 354 which are arranged to cause further pressure and heat to be applied to said cover as it proceeds through the unit. At the far end of the unit, the cover is picked up by the soft rubber covered rolls 355 and 356 which are arranged to apply further pressure over the whole area of the cover and so insure complete sealing and perfect flatness.

The upper endless belt 351 at its egress end passes around a drive roll 425 and at its ingress end around an idler roll 426, and the lower endless belt at its egress end passes around a drive roll 427 and at its ingress end around an idler roll 428. Both drive rolls are rotatably mounted in bearings supported by side plates 429 and 430 forming part of the whole framework 431. The idler rolls 426 and 428 are likewise rotatably mounted in bearings supported by slotted bolt tensioning and aligning plates 432 and 433 adjustably mounted on side plates 434 and 435 also forming part of the whole framework 431.

The pressure rolls 355 and 356 are also mounted in the frame side plates 429 and 430 and are adjustable toward and from each other by adjusting screws 357 and 358 to alter the pressure applied to the covers emerging from the belts.

The drive rolls 425 and 427 are driven continuously by standard variable speed drive to impart to the endless belts a common linear speed which is predetermined according to the heating period set for the heat sealing and smoothing operation. The pressure rolls 355 and 356 are driven by the same standard variable speed drive but at a peripheral speed slightly higher than the linear speed of the belts to pull the emerging covers from between the belts under a slight tension to avoid buckling.

It will be noted that the upper heating unit 353 is arranged above the lower stretch of the upper belt 351, while the lower heating unit 354 is arranged below the upper stretch of the lower belt. The two heating units are shown as supported in the framework by brackets 436 and 437. The lower heating unit 354 is fixed in position to afford support to the overlying elements but the upper heating unit 353 is yieldably mounted, as by spring plungers 438 and 439 on the supporting brackets, so as thus to rise and fall to accommodate covers of different thicknesses. Since the heat from the heating units is transmitted to the covers from the endless belts, they (the belts) are made of some suitable heat resisting material such as asbestos or fiberglass or combinations of the two. It should also be noted that the heating units 353 and 354 are arranged to cover the full width of the end-belts and are made of sufficient length to provide a suitable heating cycle for sealing the complete area of the liner in the cover by activating the adhesive between their contacting faces. As will be understood, a whole procession of covers will pass through the heating unit, the delivery intervals being such as to avoid overlapping.

In FIG. 26 is shown the timing chart for the cams mounted on the main shaft and the back shaft. In box No. 1 is shown the action imparted to the die actuating cam 65 on shaft 36 by the cam slot 215 on the back of cam 143 on the main shaft. This motion is imparted to die actuating cam 65 through the sleeve 62 on main shaft 36 and whose action is shown in box No. 2. The actual die positions are shown in order to make it clear when studying the whole series of motions, how they are interrelated and controlled to produce an end product in complete form. In box No. 3 is shown the operations of the die head lifting cam 204 and here again the operations performed by the cam are shown and explained. In box No. 4 is shown the motions imparted to the folder blades by the left and right folder lift cams 142 and 143 with the operations performed by the cams in lifting the folder mechanism up and down. In box No. 5 is shown the folder blade motion cams, front 169, back 171 and end 170, to further disclose the actuations of the folder blades. In this set of cams, it must be remembered that cams 169 and 171 are mounted on 170 and are movable circumferentially thereon, as shown in FIG. 23, to vary the sequence of operation of the folder blades; and this chart clearly discloses how they may be varied and the different results that can be attained by this variation. In box No. 6 is shown the electrical timing cam 200 with its lobes 201 and 202 for actuating the drive and heat sealing mechanisms.

FIG. 27 depicts the sequences in straight line form to further make it possible to reveal by the bottom line a complete sequence of operations performed during any one complete 360° cycle. It will be noted that, insofar as the operation of the cover transfer mechanism is concerned, this operation takes place in the last 50° of rotation of the main shaft, that is to say, the cover is picked up immediately after the folder blades are opened to be transferred to the heat sealing unit for completion of the sealing, as indicated on the straight line in FIG. 27. It is not felt necessary to discuss the chart at length as it really speaks for itself.

It is now possible to look back over these charts and determine exactly what is happening in the operation of the different mechanisms and the positioning of the different elements to produce a finished product at the end of one full rotation of the main shaft. The cam charts are laid out in angular displacement from 0° to 360°.

In the forming of round corners, it is necessary to provide some means of controlling the cover material as it is formed over the die and the FIGS. 38, 38A, 39, 40, 41 and 42 show a novel method that has been developed to provide perfect round and flat corners.

In FIG. 38 is shown a section through the material control device. The die 40 is shown with the liner 400 on its face and the cover 401 partially folded in under the material control plate 405, which latter is loosely held on stud 407 and lays down on nut 408 and pivots about this point. The stud 406, held in place by thin nut 412, is used to spring load the plate 405 and the two nuts 410 and 411 are used to adjust the pressure of spring 409. In normal position, when not in use, the plate 405 must be downwardly inclined toward the folder blade 24 and must be forced upwards as the folder blade moves inwardly and underneath to fold the cover 401 over the liner 400 and die 40 from the outside edges towards the middle and thus distribute the material evenly over the 90° arc of the corner.

In FIG. 38A the cover 401 is shown completely folded in over the liner 400 and the die 40 to thus form a perfectly smooth and flat corner.

FIG. 39 is a top view of the material control device and the line 415 shows how the material of the cover 401 is formed inwardly, first on both sides of the plate 405 and then evenly distributed over the 90° arc of the corner, in even tight folds as the folder blades 24 are moved inwardly at a 45° angle indicated by arrow 411. The material is placed in tension both above and below the folder blades 24 and is thus folded inwardly along the 45° angle to form a round corner as shown in FIG. 41. FIG. 42 shows a corner that would result without using the material control device.

FIG. 40 is a perspective view of the control device in order to better show its relationship to the corners of the die 40.

The liners that may be used in the forming of flexible book covers may be made up of one piece or an assembly of a number of pieces or may be made up of two separate pieces held on the face of the die, in which latter case an additional gage will be used to properly locate the liners on the die face.

In the accompanying drawings, the invention has been shown in preferred form and by way of example but many changes and variations may be made therein without departing from the spirit of the invention. It should therefore be understood that the invention is not limited to any particular form or arrangement except insofar as such limitations are contained in the appended claims.

What is claimed is:

1. In a machine for forming a flexible book cover or the like with an adhesively attached liner, the combination of a stationary pad upon which the cover blank is supported, a contractible and extensible die, means for effecting the contraction and extension of the die, said die in its normal extended and loading position including means to support for the liner, means moving the die while extended to place the linear in proper position upon the cover blank and for subsequently returning the die to its loading position, folder blades movable in one direction to turn the marginal edges of the cover blank inwardly above the die while it is still extended and then movable in a different direction to press said edges into adhesive contact with the liner after the die has been contracted, and means for effecting such two-way movements of the folder blades.

2. The combination according to claim 1, wherein the folder blades normally occupy a retracted position to permit the liner to be placed upon the cover blank, said folder blades in said retracted position being movable facewise with reference to the extended die to turn the marginal edges of the cover blank into a perpendicular position with reference to the extended die.

3. The combination according to claim 2, wherein the folder blades are then movable inwardly in their own plane to turn the marginal edges of the cover blank over the extended die.

4. The combination according to claim 3, wherein the folder blades are thereafter movable facewise away from the extended die to permit the retraction of the die.

5. The combination according to claim 1, wherein the marginal edges of the linear or the cover blank in their zones of contact have a heat activated adhesive coating, and including heating means contained in the supporting pad for the cover blank for activating said adhesive coating while the folder blades are in their pressing position.

6. The combination according to claim 5, including means for controlling the temperature and time of application of the adhesive activating heat.

7. The combination according to claim 6, wherein, after the heating period for the adhesive coating, the folder blades are again movable in a facewise direction away from the blank and outwardly in their own plane back to a retracted position to permit the removal of the formed cover.

8. The combination according to claim 5, wherein the liner or the cover blank has a heat activated adhesive coating on their contacting face, and including a heating unit for activating said adhesive face coating after the formed cover has been removed from its supporting pad as well as means for transferring said cover from its supporting pad to said heating unit.

9. The combination according to claim 1, wherein the die moving means and the folder blade moving means include a power operated main cam shaft adapted to make one complete rotation in each cycle of operation of the machine and operative connections from said shaft to the movable die and to the movable folder blades to carry out their movements in proper timed relation.

10. The combination according to claim 8, wherein the die moving means, the folder blade moving means and the cover transferring means include a power operated main cam shaft, adapted to make one complete rotation in each cycle of operation of the machine, for operating all three said means in proper timed relation.

11. The combination according to claim 11, wherein the heating unit comprises a pair of continuously operated endless conveyor belts arranged one above the other in spaced relation to accept the formed covers between their adjacent stretches and carry them forward to a delivery station, a pair of elongated thermostatically controlled heaters for activating the adhesive coatings of the formed covers, one of said heaters being arranged below the upper stretch of the lower belt and in contact with the lower face thereof, and the other of said heaters being arranged above the lower stretch of the upper belt and in contact with the upper face thereof, one of said heaters being yieldably mounted with reference to the other to accommodate covers of different thicknesses as well as to apply sealing pressure thereto, and means for driving the endless conveyor belts at a speed related to the temperature developed by the heaters in activating the adhesive coatings.

12. The combination according to claim 11, wherein the heating unit also comprises a pair of pressure rolls located at the egress end of the conveyor belts and arranged to apply additional pressure to the cover for final smoothing and sealing of the emerging covers.

13. The combination according to claim 1, wherein the die is formed with at least one rounded corner and wherein there are at least two folder blades to cooperate with the die, said blades being formed when in their folding position to present a correspondingly rounded corner, and including a rounded-edge presser plate overlying the folder blades in the area of the rounded corner and which acts to turn the marginal edges of the cover blank back upon themselves at the corner during the initial inward movement of the folder blades in order to gather the material into a series of closely spaced evenly distributed folds.

14. The combination according to claim 13, wherein the rounded edge of the presser plate has a radius of curvature greater than that of the rounded corner of the die and folder blades.

15. The combination according to claim 14, wherein the presser plate is normally arranged at a downward inclination with respect to the folder blades and is yieldably mounted to be lifted by the inward movement of the folder blades through the medium of the turned-in edges of the cover blank.

16. A heat sealing and smoothing unit for laminating parts coated with a heat activatable adhesive to form an assembly and comprising, in combination, a pair of continuously operated conveyor belts arranged one above the other in spaced relation to accept an assembly of the adhesively coated parts between their adjacent stretches and carry the assembly forward to a delivery station, a pair of elongated thermostatically controlled heaters for activating the adhesive coatings of the assembly, one of said heaters being arranged below the upper stretch of the lower belt and presenting a flat continuous surface in contact with the lower face thereof, and the other of said heaters being arranged above the lower stretch of the upper belt and presenting a flat continuous surface in contact with the upper face thereof, one of said heaters being yieldably mounted with reference to the other to accommodate assemblies of different thicknesses as well as to apply sealing pressure thereto, and means for driving the endless conveyor belts at variable speeds related to different temperatures developed by the heaters in activating the adhesive coatings.

References Cited in the file of this patent

UNITED STATES PATENTS

| | | |
|---|---|---|
| 834,011 | Leffler | Oct. 23, 1906 |
| 1,336,944 | Dean | Apr. 13, 1920 |
| 1,386,676 | Anthony | Aug. 9, 1921 |
| 1,811,871 | Anthony | June 30, 1931 |
| 2,451,728 | Gardner et al. | Oct. 19, 1948 |
| 2,579,488 | Freeman | Dec. 25, 1951 |
| 2,625,287 | Holt et al. | Jan. 13, 1953 |
| 2,727,648 | Grevich | Dec. 20, 1955 |
| 2,800,162 | Rohdin | July 23, 1957 |

UNITED STATES PATENT OFFICE
CERTIFICATE OF CORRECTION

Patent No. 3,128,484                            April 14, 1964

William H. Rogers et al.

It is hereby certified that error appears in the above numbered patent requiring correction and that the said Letters Patent should read as corrected below.

Column 1, line 46, for "hook" read -- book --; column 6, line 59, before "thereon" insert -- held --; column 16, line 68, for "and" read -- are --; column 18, line 17, for "feasbility" read -- feasibility --; column 21, line 73, and column 22, line 22, for "linear", each occurrence, read -- liner --; column 22, line 57, for the claim reference numeral "11" read -- 8 --.

Signed and sealed this 28th day of July 1964.

(SEAL)

Attest:

ESTON G. JOHNSON                           EDWARD J. BRENNER
Attesting Officer                              Commissioner of Patents